(12) United States Patent
Vanhentenrijk et al.

(10) Patent No.: US 10,910,810 B2
(45) Date of Patent: Feb. 2, 2021

(54) GEL SEALING DEVICE

(71) Applicant: CommScope Connectivity Belgium BVBA, Kessel-Lo (BE)

(72) Inventors: Robert Vanhentenrijk, Winksele (BE); Ronnie Rosa Georges Liefsoens, Tessenderio (BE); Pieter De Coster, Bekkevoort (BE)

(73) Assignee: CommScope Connectivity Belgium BVBA

( * ) Notice: Subject to any disclaimer, the term of this patent is extended or adjusted under 35 U.S.C. 154(b) by 0 days.

(21) Appl. No.: 16/415,611

(22) Filed: May 17, 2019

(65) Prior Publication Data

US 2019/0379197 A1    Dec. 12, 2019

Related U.S. Application Data

(63) Continuation of application No. 15/707,447, filed on Sep. 18, 2017, now Pat. No. 10,298,003, which is a
(Continued)

(30) Foreign Application Priority Data

Dec. 3, 2009    (EP) .................................... 09014999

(51) Int. Cl.
*H02G 15/013*    (2006.01)
*F16J 15/10*    (2006.01)
(Continued)

(52) U.S. Cl.
CPC .......... *H02G 15/013* (2013.01); *F16J 15/102* (2013.01); *G02B 6/4444* (2013.01);
(Continued)

(58) Field of Classification Search
CPC ....... H01R 4/70; H01R 9/0521; H01R 15/013
(Continued)

(56) References Cited

U.S. PATENT DOCUMENTS 3,725,581 A    4/1973 Gillemot et al.
3,833,754 A    9/1974 Philibert
(Continued)

FOREIGN PATENT DOCUMENTS

DE    30 25 766 A1    1/1982
DE    31 29 489 A1    2/1983
(Continued)

OTHER PUBLICATIONS

European Search Report for Europe Application No. EP 09 01 4999 dated May 7, 2010.
(Continued)

*Primary Examiner* — Kristina R Fulton
*Assistant Examiner* — L. Susmitha Koneru
(74) *Attorney, Agent, or Firm* — Merchant & Gould P.C.

(57) ABSTRACT

A gel sealing device includes a gel sealing block (5) which provides a sealing section (22) through which the elongate parts (13, 14) extend. The gel sealing block (5) includes an upper flange (11) and a lower flange (12) with a support section (11a, 12a, 12b) disposed therebetween. The upper and lower flanges (11, 12) sandwiches, in direction of extension of the elongate parts (13, 14), a gel inner ring (7) supported by said support section (2) and a gel outer ring (6, 10a) covering the gel inner ring (7) in a radial direction extending transverse to said extension direction. The gel inner ring (7) and the gel outer ring (6, 10a) are made of a gel sealing material.

20 Claims, 10 Drawing Sheets

Related U.S. Application Data continuation of application No. 15/077,307, filed on Mar. 22, 2016, now Pat. No. 9,768,604, which is a continuation of application No. 13/513,124, filed as application No. PCT/EP2010/068362 on Nov. 29, 2010, now Pat. No. 9,343,891.

(51) Int. Cl.
*G02B 6/44* (2006.01)
*H02G 15/076* (2006.01)
*H02G 15/117* (2006.01)

(52) U.S. Cl.
CPC ......... *G02B 6/4471* (2013.01); *H02G 15/076* (2013.01); *H02G 15/117* (2013.01)

(58) Field of Classification Search
USPC .................. 174/84 R, 89, 93, 153 G
See application file for complete search history.

(56) References Cited

U.S. PATENT DOCUMENTS

| | | | |
|---|---|---|---|
| 4,345,784 A | 8/1982 | Walling | |
| 4,572,923 A | 2/1986 | Castellani et al. | |
| 4,963,698 A * | 10/1990 | Chang | H01R 4/70 156/49 |
| 5,258,578 A * | 11/1993 | Smith | H02G 15/013 174/93 |
| 5,425,171 A | 6/1995 | Kroger et al. | |
| 5,431,758 A * | 7/1995 | Delalle | H01R 4/22 156/49 |
| 5,446,823 A * | 8/1995 | Bingham | G02B 6/4422 174/93 |
| 5,548,678 A | 8/1996 | Frost et al. | |
| 5,758,004 A * | 5/1998 | Alarcon | G02B 6/4471 385/135 |
| 5,764,844 A | 6/1998 | Mendes | |
| 5,774,618 A | 6/1998 | Jones | |
| 5,775,702 A | 7/1998 | Laeremans et al. | |
| 6,041,858 A | 3/2000 | Arizmendi | |
| 6,046,406 A | 4/2000 | Milanowski et al. | |
| 6,088,886 A | 7/2000 | Gyongyosi | |
| 6,100,472 A | 8/2000 | Foss | |
| 6,150,608 A * | 11/2000 | Wambeke | G02B 6/4428 16/2.1 |
| 6,248,953 B1 * | 6/2001 | Miller | H02G 15/013 174/74 R |
| 6,353,186 B1 * | 3/2002 | Dams | F16L 3/2235 174/667 |
| 6,802,512 B2 * | 10/2004 | Muller | H02G 15/013 174/653 |
| 6,854,522 B2 * | 2/2005 | Brezinski | E21B 33/12 166/387 |
| 7,038,137 B2 | 5/2006 | Grubish et al. | |
| 7,737,361 B2 * | 6/2010 | Huspeni | C08G 18/10 174/74 R |
| 7,780,173 B2 | 8/2010 | Mullaney et al. | |
| 8,055,114 B2 | 11/2011 | Kluwe et al. | |
| 8,604,360 B2 | 12/2013 | Knorr et al. | |
| 9,343,891 B2 | 5/2016 | Vanhentenrijk et al. | |
| 9,768,604 B2 | 9/2017 | Vanhentenrijk et al. | |
| 2002/0146229 A1 | 10/2002 | Roberts | |
| 2003/0156798 A1 | 8/2003 | Cull | |
| 2004/0080119 A1 | 4/2004 | Goll | |
| 2004/0100028 A1 | 5/2004 | Desard et al. | |
| 2006/0063418 A1 | 3/2006 | Motzigkeit | |
| 2006/0204198 A1 * | 9/2006 | Michiels | G02B 6/4446 385/135 |
| 2006/0254049 A1 | 11/2006 | Johnsen | |
| 2007/0023200 A1 * | 2/2007 | Michiels | H02G 15/013 174/93 |
| 2007/0125569 A1 | 6/2007 | Marszalek et al. | |
| 2009/0103877 A1 | 4/2009 | Kluwe et al. | |
| 2009/0304341 A1 | 12/2009 | Shimirak et al. | |
| 2009/0309313 A1 | 12/2009 | Knorr et al. | |
| 2013/0014974 A1 | 1/2013 | Burke et al. | |
| 2013/0020771 A1 | 1/2013 | Vanhentenrijk et al. | |
| 2014/0041893 A1 | 2/2014 | Adams et al. | |
| 2015/0155696 A1 | 6/2015 | Coenegracht et al. | |
| 2015/0168664 A1 | 6/2015 | Coenegracht et al. | |
| 2015/0357809 A1 | 12/2015 | Coengracht | |
| 2015/0380919 A1 * | 12/2015 | Aznag | H02G 15/013 174/564 |

FOREIGN PATENT DOCUMENTS

| | | | |
|---|---|---|---|
| DE | 33 22 809 A1 | 1/1985 | |
| DE | 20 2006 006 019 U1 | 6/2006 | |
| DE | 20 2011 003 754 U1 | 6/2012 | |
| DE | 10 2012 112 510 A1 | 6/2014 | |
| EP | 0 442 941 B1 | 1/1995 | |
| EP | 0 638 976 A1 | 2/1995 | |
| EP | 0 652 619 A1 | 5/1995 | |
| EP | 0 587 616 B1 | 7/1996 | |
| EP | 0 426 658 B1 | 11/1996 | |
| EP | 0 681 598 B1 | 9/1997 | |
| EP | 0 841 734 A1 | 5/1998 | |
| EP | 1 710 882 A2 | 10/2006 | |
| EP | 2 330 706 A1 | 6/2011 | |
| EP | 2 365 367 A1 | 9/2011 | |
| GB | 2 307 563 | 5/1997 | |
| WO | WO 94/00786 A1 | 1/1994 | |
| WO | WO 95/24756 A1 | 9/1995 | |
| WO | WO 96/32660 A1 | 10/1996 | |
| WO | WO 97/42693 A1 | 11/1997 | |
| WO | WO-9742693 A1 * | 11/1997 | H02G 15/013 |
| WO | WO 99/56370 A1 | 11/1999 | |
| WO | WO 01/28057 A1 | 4/2001 | |
| WO | WO 02/33796 A2 | 4/2002 | |
| WO | WO 02/063736 A1 | 8/2002 | |
| WO | WO 02/097488 A2 | 12/2002 | |
| WO | WO 2005/027290 A1 | 3/2005 | |
| WO | WO 2006/118747 A1 | 11/2006 | |
| WO | WO 2007/118548 A1 | 10/2007 | |
| WO | WO 2007/137717 A1 | 12/2007 | |
| WO | WO 2008/112118 A2 | 9/2008 | |
| WO | WO 2009/148604 A2 | 12/2009 | |
| WO | WO 2011/067190 A2 | 6/2011 | |
| WO | WO 2012/152789 A2 | 11/2012 | |
| WO | WO 2014/095462 A1 | 6/2014 | |

OTHER PUBLICATIONS

Extended European Search Report for corresponding European Patent Application No. 16200787.6 dated Feb. 23, 2017, 8 pgs.
International Search Report for International Application No. PCT/EP2010/068362 dated Jul. 5, 2011.
International Search Report for International Application No. PCT/EP2013/063486 dated Feb. 6, 2014 (6 pages).
International Search Report for International Application No. PCT/EP2013/063495 dated Feb. 6, 2014 (5 pages).
International Search Report for International Application No. PCT/EP2013/063497 dated Feb. 6, 2014 (6 pages).
International Search Report for International Application No. PCT/EP2013/063500 dated Feb. 6, 2014 (7 pages).

* cited by examiner

GEL SEALING DEVICE

CROSS REFERENCE TO RELATED APPLICATIONS

This application is a continuation of application Ser. No. 15/707,447, filed Sep. 18, 2017, now U.S. Pat. No. 10,298,003, which is a continuation of application Ser. No. 15/077,307, filed Mar. 22, 2016, now U.S. Pat. No. 9,768,604, which is a continuation of application Ser. No. 13/513,124, filed Oct. 4, 2012, now U.S. Pat. No. 9,343,891, which is a National Stage Application of PCT/EP2010/068362, filed Nov. 29, 2010, which claims benefit of Ser. No. 09/014,999.8, filed Dec. 3, 2009 in Europe and which applications are incorporated herein by reference. To the extent appropriate, a claim of priority is made to each of the above disclosed applications.

BACKGROUND

The present invention relates to a gel sealing device for sealing a passage of elongate parts through an opening. The gel sealing device provides a sealing section through which the elongate parts extends, wherein the gel sealing device comprises a gel sealing block having an upper flange and a lower flange with a support section disposed therebetween for supporting a gel ring sandwiched between the flanges in direction of extension of the elongate parts and which forms the sealing section.

Such a gel sealing device is e.g. known from WO 2005/027290 A1, which finds particular application in the field of telecommunications technology to which the present invention also preferably relates.

The known gel sealing device is accommodated in a lower housing body which is connectable to an upper housing body which forms a cable organizing area and is provided with a foldable gel ring comprising two semicircular gel ring segments which abut against each other in a radial inner area of the gel sealing device to form a common sealing section therebetween through which a plurality of cables extends. Conventionally, the plurality of cables comprises at least one cable from a provider site and at least one cable ranging to a customer site, e.g. a dwelling unit, wherein said provider cable and said customer cable are spliced within the organising area provided in an area of the upper housing body in which the splicing is sealed against environmental influences. The provider cable denoting a main cable may comprise one or more signal transmitting elements, such as an optical fibre element or a metal wire element, which is at last surrounded by an outer jacket protecting said element. The customer cable normally comprises an optical fibre element or a metal wire element to be spliced with the assigned element of the main cable in the organizing area of the upper housing body, wherein said optical fibre element or metal wire element is also protected by an outer jacket or a tube as e.g. used in blown fibre application.

Normally, the housing and the gel sealing device are accessed during its lifetime for several times in order to install individually, further cables at different times.

Thereby, the sealing section through which the cables extend, needs to be made accessible for introducing therein, the further cables to be installed. By the accessing of the sealing section, all cables extending therethrough are exposed accessibly. Accordingly, during installation of further cables, particular attention is demanded for the cables already installed and extending through the gel sealing device to prevent damage or the like of said cables.

SUMMARY

It is an object of the present invention to provide a gel sealing device for sealing a passage of elongate parts through an opening, wherein said gel sealing device has improved cable access properties.

The present invention is based on the concept that the gel sealing device has a gel sealing block which comprises a gel inner ring and a gel outer ring covering the gel inner ring in a radial direction and comprising a first circumferential segment and at least one second circumferential segment which is adapted to be detachable from the first circumferential segment to provide a separate accessible sealing section. Detachment in the sense of the present invention relates to a release of the respective part and also to a reassemble of said part after releasing it. Particularly, the at least one second circumferential segment is adapted to be repeatedly releasable and attachable to said first circumferential segment. The gel outer ring is made of a gel sealing material commonly known for cable housings used in the technical field of telecommunication technology. This gel sealing material is a highly viscous liquid which can be regarded as a pseudo plastic or non-Newtonian fluid (cp. EP 0 426 658 B1 and EP 0 681 598 B1). In other words, the gel sealing material has the capability of being deformable to adopt as a negative pattern, the contours of the surfaces of the parts surrounding the gel sealing material, particularly of the upper and lower flanges and of a housing body accommodating the gel sealing device, provided for contacting the gel sealing material to perform sealing and for supporting axially and radially the gel outer ring and the gel inner ring. Furthermore, as the gel inner ring is also made of such a gel sealing material, the portion of the plurality of elongate parts, which are preferably constituted by a plurality of cables extending between the gel outer ring and the gel inner ring will be fully surrounded, i.e. encapsulated in its circumferential direction by the gel sealing material. Accordingly, the gel sealing material will flow and will be pressed towards the contact surfaces provided with the housing for the gel sealing material by exerting a predetermined pressure onto said gel sealing material, wherein a sealing is obtained therebetween. Said pressure can be preferably achieved by dimensioning the gel outer ring and/or gel inner ring larger than a space provided in the gel sealing device for supporting the gel outer and inner rings, respectively. Alternatively, or in addition thereto, the gel sealing device is preferably adapted to compress the gel outer and inner rings with respect to each other, preferably by moving at least the upper flange or the lower flange towards the other flange.

According to the present invention, the gel outer ring is comprised of at least two circumferential segments, in particular, of at least two separate circumferential segments, wherein at least two separate sealing sections are provided which are separately accessible from each other by detaching the at least one second circumferential segment from the first circumferential segment. Thus, a single elongate part or a plurality of elongate parts can be inserted into said exposed separate sealing section, wherein the other elongate part or a plurality of other elongate parts extending through the other sealing section is still covered by the first circumferential segment and can stay untouched. In other words, the separate accessible sealing section can be handled by inserting, removing, replacing or the like an assigned elongate part or a plurality of assigned elongate parts without affecting the at least one remaining sealing section still covering the elongate part or parts extending therethrough. Hence, no particular attention is needed for the elongate parts provided through the sealing section not to be accessed. Furthermore, a faster installation of further elongate parts at different times can be obtained, since no time or thought is required for taking care of the elongate parts extending through the sealing section which is not accessed. Preferably, as the present invention finds preferably application in the field of telecommunication technology, an elongate part is constituted by a commonly known cable protecting a signal transmitting element such as an optical fibre element or a metal wire element as described above.

Preferably, the gel sealing block of the gel sealing device has a wrap-around shape with the gel outer ring forming a part of a circumferential outer surface of the gel sealing device and provided to contact an inner circumferential surface of a receiving body forming a passage communicating with an opening through which the elongate parts extend. Further, the receiving body is adapted to receive the gel sealing device in its passage. The receiving body forms preferably a part of a housing which can be formed of a cable joint box or a boot for instance. These housing bodies are usually made by injection moulding of a plastic material. The housing (boot) preferably comprises a first housing (boot) part forming the cable organizing area and being preferably releasably connected to a second housing (boot) part which forms the receiving body for receiving the gel sealing device. The first housing (boot) part is denoted in the following "upper housing body", whereas the second housing (boot) part is designated in the following "lower housing body". The lower housing body is further preferably adapted to support the gel sealing device at least in longitudinal direction of the passage. The upper and lower housing bodies can be connectable to each other in the longitudinal direction of the passage, wherein a separation of the upper and lower housing bodies is preferably provided transversal to the longitudinal direction of the passage. In addition or alternatively thereto, the upper housing body and/or the lower housing body can be formed of two halves, wherein the separation of the halves is provided in parallel to the longitudinal direction of the passage as known.

The wrap-around shape of the gel sealing block can be a polygon shape or a round shape. In general, the wrap-around shape can be realized by any design having a continuous circumference. Furthermore, the outer circumferential surface of the gel outer ring does not necessarily need to contact the inner circumferential surface of the lower housing body in an assembled state of the housing. Notwithstanding, this configuration allows a simple structure of the gel sealing device, as a sealing between the inner circumferential part of the lower housing body and the outer circumference of the gel sealing device can be easily obtained by the gel outer ring. Alternatively, a configuration of the gel sealing device is conceivable which comprises a cover covering the outer circumferential surface of the gel outer ring, and a further seal for sealing an area between the inner circumference of the lower housing body and the outer circumference of the cover.

Concerning the directions and positions of upper, lower, axial, circumferential, inner, outer and radial as indicated for describing the invention, an upper and lower direction is to be understood as running parallel to an axial, i.e. longitudinal direction of the passage of the lower housing body through which the plurality of cables extend and which corresponds to a direction of extension of said cables, wherein the upper direction directs to an upper side of the lower housing body, which faces the upper housing body, and wherein the lower direction directs to the opposite side, that is, the lower side of the lower housing body. Further, in the sense of the present invention, a circumferential direction refers to the direction running around the longitudinal axis of the passage, whereas an inner direction and an inner side or a radial inner direction and a radial inner side relate to the direction running perpendicular to the longitudinal axis of the passage and directing towards said axis. The outer direction (radial outer direction) and outer side (radial outer side) direct to the opposed direction of the inner direction and inner side, respectively. This explanation shall not be understood as limiting the cross sectional shape of the gel sealing device to round configuration. Oval, triangular, rectangular or polygonal cross sections are also feasible.

According to a preferred embodiment of the present invention, the second circumferential segment is sandwiched in direction of extension of the elongate parts by an upper first ring segment and a lower first ring segment, wherein said upper and lower first ring segments have a rim covering in radial direction, at least, a part of an outer circumferential surface of the second circumferential segment, and wherein said upper and lower first ring segments are releasably securable to the upper and lower flanges, respectively. The preferred configuration allows a simple release and attachment of the second circumferential segment from and to the first circumferential segment, respectively. Further, by at least partially covering the outer circumference of the gel outer ring, a radial support can be simply provided without negatively affecting a seal performance between the gel sealing device and the lower housing body, since the gel outer ring further contacts the inner circumference of the lower housing body in an assembled state of the housing to seal the area between the gel sealing device and the lower housing body.

The releasable securing of the upper and lower first ring segments is preferably obtained by at least one detent which is provided with the upper and lower first ring segments at an opposite side of the rim, wherein said at least one detent grabs the upper and lower flange, respectively, from a circumferential side thereof. In other words, the detent is adapted to overlap an outer circumferential surface of the upper and lower flange, respectively, at least partially in axial direction of the gel sealing device, wherein a hook portion of the detent is received by a recess portion provided in the circumferential surface of the upper and lower flange, respectively. The hook portion of the detent is preferably provided at an axial end side of the detent, and the recess portion is arranged at a respective assigned outer upper edge of the circumferential surface of the upper flange and at an assigned outer lower edge of the circumferential surface of the lower flange. Further preferable, the recess portion of the upper and lower flange, respectively, is adapted to completely embed the detent at least in axial or radial direction of the gel sealing device. Accordingly, the recess portion of the upper and lower flange, respectively, has a shape corresponding to a shape of the detent, wherein the detent received in the recess portion forms with the upper and lower flange, respectively, a common outer surface without ridges at the position of the detent. The second circumferential segment sandwiched by the upper and lower first ring segments can be simply clipped from the radially outer side to the outer circumference of the gel sealing device, particularly to the upper and lower flanges, respectively. Preferably, the upper and lower first ring segments have an identical shape. This configuration is particularly preferred when said second circumferential segment and the upper and lower first ring segments are adapted to cover the main cable which extends through the sealing section. More preferably, said second circumferential segment sandwiched by the upper and lower first ring segments are adapted to only cover at least one looped main cable which forms an incoming cable extending to the upper side of the lower housing body and an outgoing cable extending to the lower side of the lower housing body, wherein said incoming cable and said outgoing cable are preferably arranged directly adjacently in the sealing section. Alternatively, the incoming cable and the outgoing cable of said main cable can be provided circumferentially spaced apart, wherein at least two second circumferential segments are provided, one for covering the incoming cable and the other one for covering the outgoing cable, and wherein, preferably, each of said second circumferential segments is sandwiched by an upper and lower first ring segment as described above.

In a further preferred embodiment, the engaging part formed at the upper and lower first ring segments is preferably a receiving hole which is formed near or at the edges of the circumferential end sides of the upper and lower first ring segments, respectively, wherein said receiving hole is adapted to receive the hinge which is formed by a pin protruding from the upper and lower flanges towards the upper and lower first ring segments, respectively. In particular, said pin forming the hinge, protrudes from the upper flange in axial direction towards the lower side and the pin formed with the lower flange protrudes, in axial direction towards the upper side. The pin receiving hole is provided at an assigned position of the upper and lower first ring segments in order to receive the pin and, preferably, to allow the rotational move of the upper and lower first ring segments and of the second circumferential segment sandwiched therebetween. Said pin and the receiving hole are preferably cross-sectionally round shaped. Notwithstanding, said pin and the assigned receiving hole can also have further shapes for securing the upper and lower first ring segments to the upper and lower flanges, respectively, from the axial or radial side without a rotating capability thereof.

According to another preferred embodiment, the first circumferential segment is sandwiched in the extension direction by an upper second ring segment and a lower second ring segment, wherein said upper and lower second ring segments have a rim covering in the radial direction at least part of a outer circumferential surface of the first circumferential segment, and wherein said upper and lower second ring segments are secured to the upper and lower flanges, respectively. Said configuration corresponds substantially to the above-described configuration of the rim provided with the upper and lower first ring segments, wherein similar effects can be achieved. More preferable, the upper first ring segment and the upper second ring segment form a continuous upper ring, and the lower first ring segment and the lower second ring segment form a continuous lower ring. The continuous rims formed thereby cover the circumferential outer surface of the gel outer ring at its axial end sides, wherein a radially support of the gel outer ring can be further improved.

In a further preferred embodiment, at least, the upper ring and the upper flange or the lower ring and the lower flange comprise an alignment means for determining in circumferential direction of the flanges, a predetermined position of the upper ring and the lower ring with the gel outer ring sandwiched therebetween with respect to the upper and lower flanges. The alignment means provides an indication for a correct placement of the upper ring with respect to the upper flange and/or of the lower ring with respect to the lower flange, for simplifying the assembling procedure e.g. after the gel sealing device has been disassembled for inserting further cables. In the sense of the present invention, correct placement refers to positioning repeatedly in an identical manner, the upper ring with respect to the upper flange and/or the lower ring with respect to the lower flange. The assembling time can thereby be decreased, as a trial and error for discovering a correct position of the upper ring with respect to the upper flange and/or of the lower ring with respect to the lower flange can be avoided.

Preferably, the alignment means comprises a protrusion provided at an inner circumferential surface of at least the upper second ring segment or the lower ring segment and projecting therefrom to a radially inner side, and a protrusion receiving section provided with the upper flange or the lower flange, respectively, for receiving said protrusion. More preferably, said protrusion receiving section is adapted to receive the protrusion at least from the radially outer side or from the axial direction. Further preferable, the alignment means is formed of latching means to releasably secure the upper ring to the upper flange and/or the lower ring to the lower flange. Hence, a correct alignment and a securing of the upper ring and of the lower ring, respectively, can be simply obtained.

In a further preferred embodiment, each of the upper second ring segment and the lower second ring segment comprises at least one hinge portion preferably arranged direct adjacently to the alignment means at circumferential sides thereof, wherein the hinge portion is adapted to allow a release and attachment of the part of the upper and lower second ring segments, which extends circumferentially from said hinge portion towards its circumferential end side, from and to the upper and lower flanges, respectively, in an engaged state of the latching means, i.e. in a securing state of at least the upper ring or the lower ring. According thereto, the part of the upper and lower second ring segment extending from the hinge portion to the circumferential end side can be hinged from the gel sealing device, wherein the hinge portion forms the axis of rotation. Preferably, the hinge portion is formed of a bend extending axially over the whole axial width of the upper and lower rings, respectively. Thus, the upper and lower second ring segments are undetachably secured to the upper and lower flanges, respectively, wherein the upper and lower second ring segments with the first circumferential segment sandwiched therebetween need not to be completely disassembled from the gel sealing device for accessing the sealing section. The installation time for installing further cables can be decreased. Moreover, the sealing section formed between the first circumferential segment of the gel outer ring and the gel inner ring is thereby divided in further sub-sealing sections separately accessible with respect to each other. For this preferred embodiment, each of the upper and lower second ring segments comprises preferably at each of their circumferential end sides, a ring securing element adapted to interact with a flange securing element assigned to said ring securing element and provided at a respective position at an axial end side of the upper and lower flange, respectively, to releasably secure said second ring segment parts. More preferably, the flange securing element is formed of a pin protruding from the axial end side of the flange toward the upper and lower rings, respectively, wherein the ring securing element is formed of a recess adapted to receive said pin and which is opened to the radially inner side and to the axial side directing to the respective flange. Thereby, the releasable part of the upper and lower second ring segments can be secured to the upper and lower flanges, respectively, from a radially outer side and are securable to the respective flanges at least in circumferential direction or axial direction.

According to a further preferred embodiment, the upper and lower second ring segments are made of an elastically material, such as rubber or the like, to be simply hingeable in radial direction to accessibly expose the sealing section, wherein said second ring segments can be attached to the upper and lower flanges, respectively, as described above. Accordingly, the second ring segments sandwiching the first circumferential segment can be completely or partially bent to a radial outer side of the gel sealing device, wherein a respective part of the sealing section is accessibly exposed.

In a further preferred embodiment, at least one second ring segment of the upper and lower rings with the first circumferential segment of the gel outer ring or at least one first ring segments of the upper and lower rings with the second circumferential segments forms a single unit. Particularly, the first circumferential segment and the second circumferential segment are fixed to their assigned ring segment of the upper and lower rings preferably by a co-injection molding process. More preferably, at least the first or second circumferential segment is fixed to both ring segments of the upper and lower rings, respectively, by said co-injection molding process to form a single unit comprised of the respective ring segments of the upper and lower rings with the assigned circumferential segment of the gel outer ring sandwiched therebetween. According thereto, the gel outer ring can be simply retained by the upper and lower ring segments, wherein an assembling and disassembling of the gel sealing device is further simplified.

In another preferred embodiment of the present invention, the upper flange and the lower flange have, at their circumferential outer surface, a plurality of passageways for guiding the elongate parts in their extension direction, wherein the passageways are opened to a radial outer side of the flanges. The plurality of cables can be inserted in the gel sealing device from its radially outer side. Moreover, the upper flange and the lower flange provide by its portions, which are arranged in circumferential direction between the passageways and, thereby, defining the passageways, respectively, an abutment surface as large as can be for the gel outer ring sandwiched by the upper ring and lower ring, as only the material to form the passageways in order to allow a guide of the elongate parts therethrough is removed from the flanges. Hence, the sandwiched gel outer ring can be reliably supported and retained in axial direction of the gel sealing device.

According to a further preferred embodiment, the upper flange and the lower flange are adapted to be movable towards each other to compress the sandwiched gel inner ring and gel outer ring. More preferably, the support section comprises two rings, one ring is fixed to the upper flange at the radial inner side and the other ring is fixed to the lower flange at the radial inner side, wherein one of the rings has a free end side with a diameter smaller than a diameter of an opposed free end side of the other ring and wherein the rings are movably fitted into each other in an assembled state of the support section. Said rings protrude in axial direction from the upper and lower flanges, respectively, wherein the outer circumference of said rings form the support section which supports the gel inner ring. In an alternative preferred embodiment, only one ring is provided either with the upper flange or the lower flange, wherein the remaining flange comprises a recess adapted to receive the free end side of said ring in order to allow an axial movement of the upper and lower flanges with respect to each other. In this configuration, the single ring forms the support section for the gel inner ring.

To facilitate the axial movement of the upper and lower flanges with respect to each other, the upper flange has preferably a tension member at a central portion, wherein said tension member extends in the extension direction through an opening provided in the lower flange to a lower side of the gel sealing device and wherein the protruding end of the tension member provides a hand-hold for manually moving the upper flange towards the lower flange. This moving can be obtained by pulling the tension member.

In an alternative preferred embodiment, the tension member is formed of two parts, wherein the first part is a rod extending from the central portion of the upper flange in axial direction of the passage through the opening provided in the lower flange to the lower side of the gel sealing device and wherein the free end side of said rod is received by a stick having the hand-hold. Preferably, the free end side of said rod comprises an external screw thread, wherein said stick has an internal screw thread screwed onto said external screw thread. Further, said stick comprises lateral extensions protruding to a radial outer side and abutting in axial direction against a lower side of the gel sealing device to provide a counter surface by which the upper flange having the rod, can be axially moved towards the lower flange when the stick is rotated in circumferential direction.

According to another preferred embodiment, the gel sealing device comprises an elongate parts alignment means attached to the lower flange at a side opposing the gel sealing block, wherein the elongate parts alignment means provides an abutment surface extending transversely to the extension direction and being adapted to abut against an abutment surface formed at an inner circumferential surface of a gel sealing device receiving body. Further, the cable alignment means provides at its outer circumferential surface, a plurality of channels aligned to guide the elongate parts towards the sealing section and adapted to receive, at least, a clamping means adapted to secure the elongate part in the assigned channel, at least, in the extension direction. The elongate parts extending through the sealing section can be easily aligned by inserting the respective elongate part from a radially outer side in the assigned channel which extends in elongation of the passageways in axial direction. For each elongate part, a separate channel is preferably provided. Accordingly, the elongate parts extending to the lower and upper sides of the gel sealing device receiving body are placed in circumferential direction of the gel sealing device, wherein for each elongate part, a separate channel and passageway is provided.

In a further preferred embodiment, the elongate parts alignment means has a recess portion at a circumferential outer surface of a wall side forming the channel. Further, the clamping means comprises a side protrusion adapted to be received by said recess portion in a clamping state of the clamping means. This allows an axial securing of the elongate parts received in the assigned channel, wherein the elongate parts can be simply aligned in axial direction of the gel sealing device. In particular, in a further preferred embodiment of the present invention, at least one of the elongate parts is formed of a tube guiding an optical fibre element or a metal wire element, wherein a tube end of the tube can be aligned at the upper side of the upper flange or in the sealing section provided between the gel outer ring and the gel inner ring by axial fixation of the tube on the elongate parts alignment means by means of the clamping means.

BRIEF DESCRIPTION OF THE DRAWINGS

The present invention will now be described in further detail by referring to a preferred embodiment depicted in the accompanying drawings. In these drawings.

DETAILED DESCRIPTION

For the following description of the housing 1, it is to be understood that an upper direction is directed to the side of the lower housing body 3 to which the upper housing body 2 is connected, whereas a lower direction refers to the opposed side thereof. An inner direction relates to the direction pointing to the central axis of the tubular-shaped lower housing body 3, whereas an outer direction corresponds to a direction from the central axis of the lower housing body 3 up to its radial outer side. A circumferential direction refers to a direction running in parallel with the circumference about the central axis of the lower housing body 3. An axial direction refers to the direction running parallel with the middle axis of the lower housing body 3.

Figure 1A:
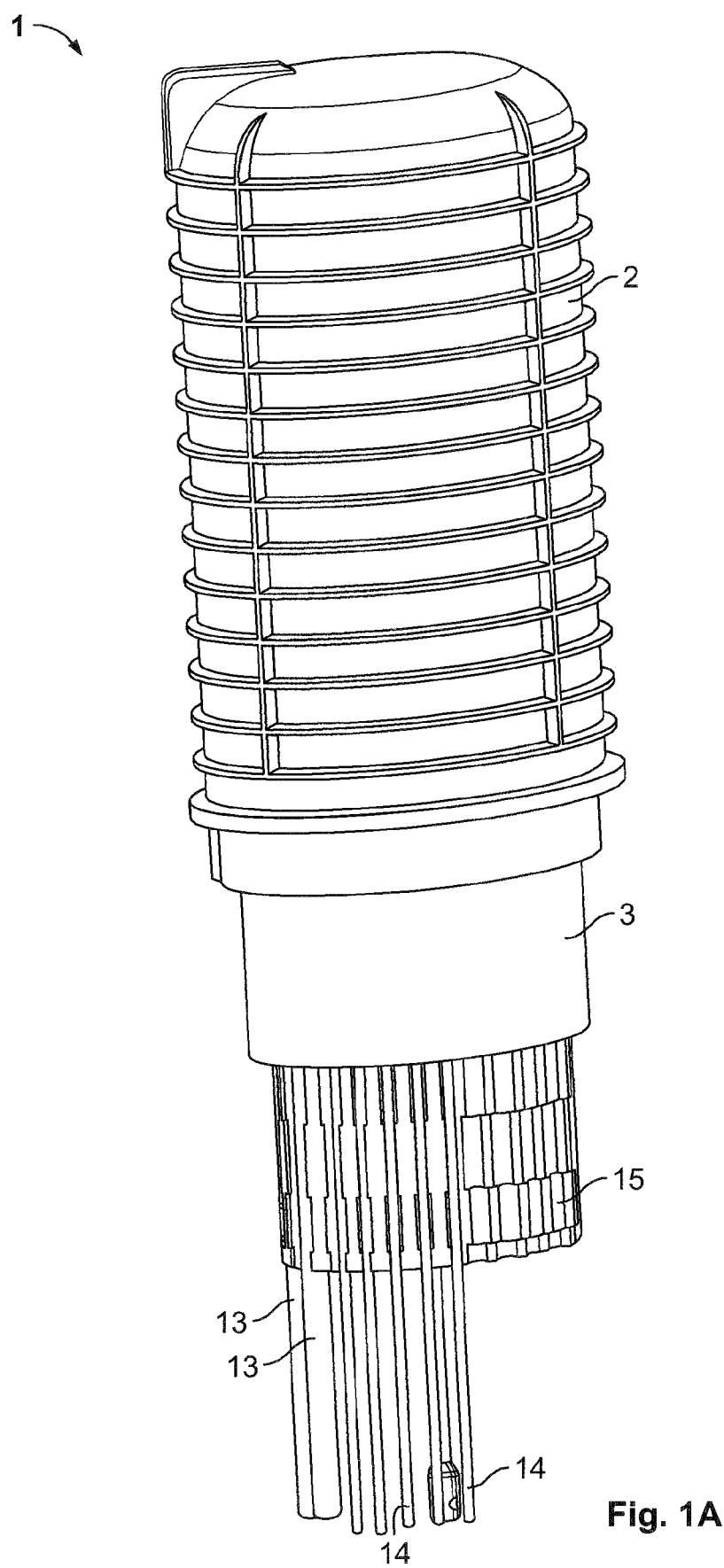
FIGS. 1A-1C show a perspective side view of a housing comprising a gel sealing device according to the embodiment in an assembled and disassembled state of the upper and lower housing bodies.
Figure 1B:
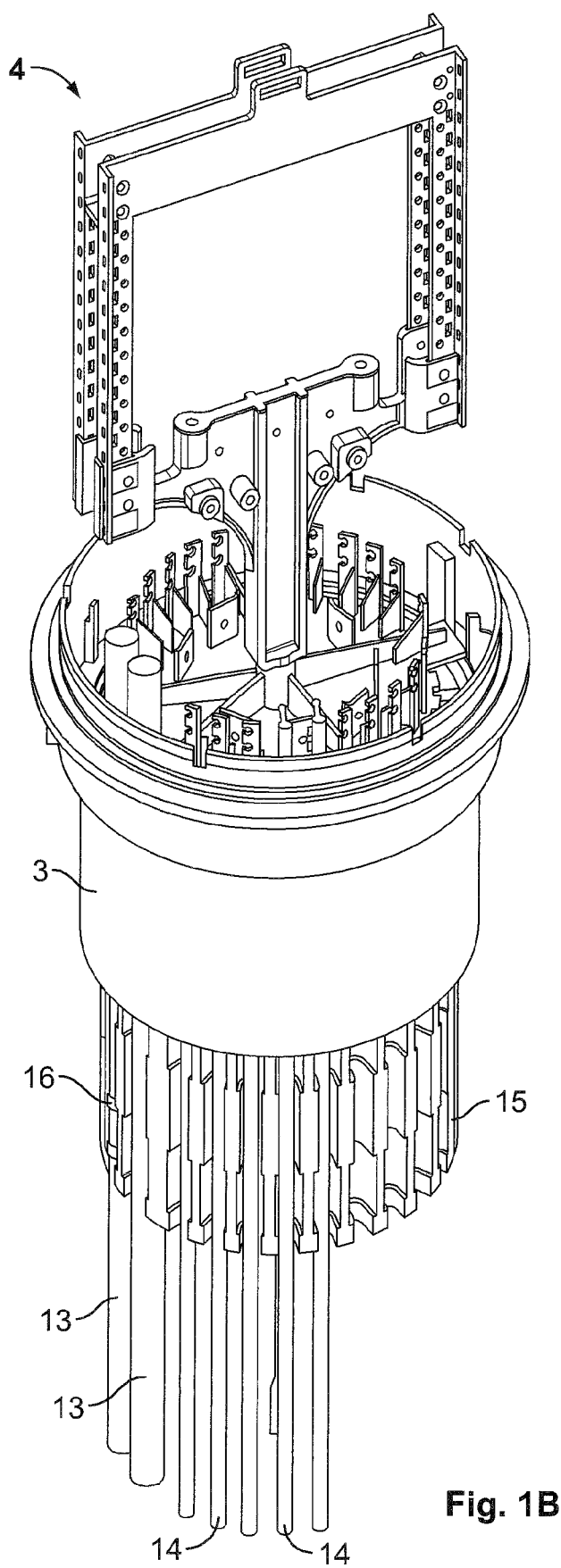
Figure 1C:
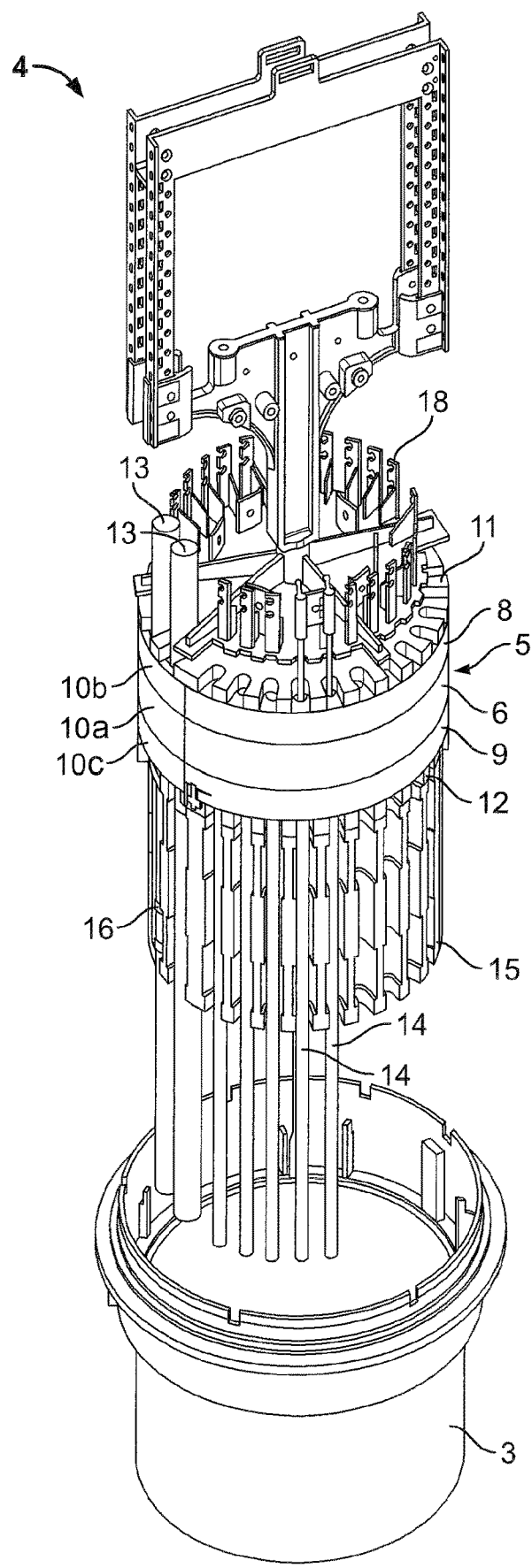

FIGS. 1A to 1C show a perspective side view of the housing 1 comprising the lower housing body 3 of a tubular shape forming a passage for guiding the main cable 13 and a plurality of cables guided by a plurality of tubes 14 from the lower side to an upper side of the lower housing body 3. The upper side of the lower housing body 3 closed by the upper housing body 2 in the assembled state of the housing 1 defines a cable organizing area in which the plurality of cables, i.e. the main cable 13 and the plurality of cables guided by the tubes 14 are handleable. Said organizing area has a loop section holder 4 attached to a fixation member holder 18. As can be seen from FIG. 1C and particularly from FIG. 2, the housing 1 comprises a gel sealing device which is received and held in the passage of the lower housing body 3, wherein the fixation member holder 18 and the loop section holder 4 are arranged on the upper side of the gel sealing block 5. The loop section holder 4 provides a base for at least one loop section (not shown) to be attached to said loop section holder 4. The loop section is adapted to store an overlength of the assigned cable. The fixation member holder 18 has a disc-like shaped fixation member holder base 18a having a receiving portion 18f provided at the central portion for allowing attachment of the loop section holder 4 to the fixation member holder 18. The receiving portion 18f is formed of a protrusion extending in axial direction to the upper side and having a receiving hole adapted to receive a pin-like part of the loop section holder 4 provided at its lower end and having a polygon shape. The receiving hole of the receiving portion 18f has a corresponding shape at its inner circumferential side. Thereby, a rotational move of the loop section holder 4 in an assembled state with respect to the fixation member holder 18 is prevented.

Figure 2:
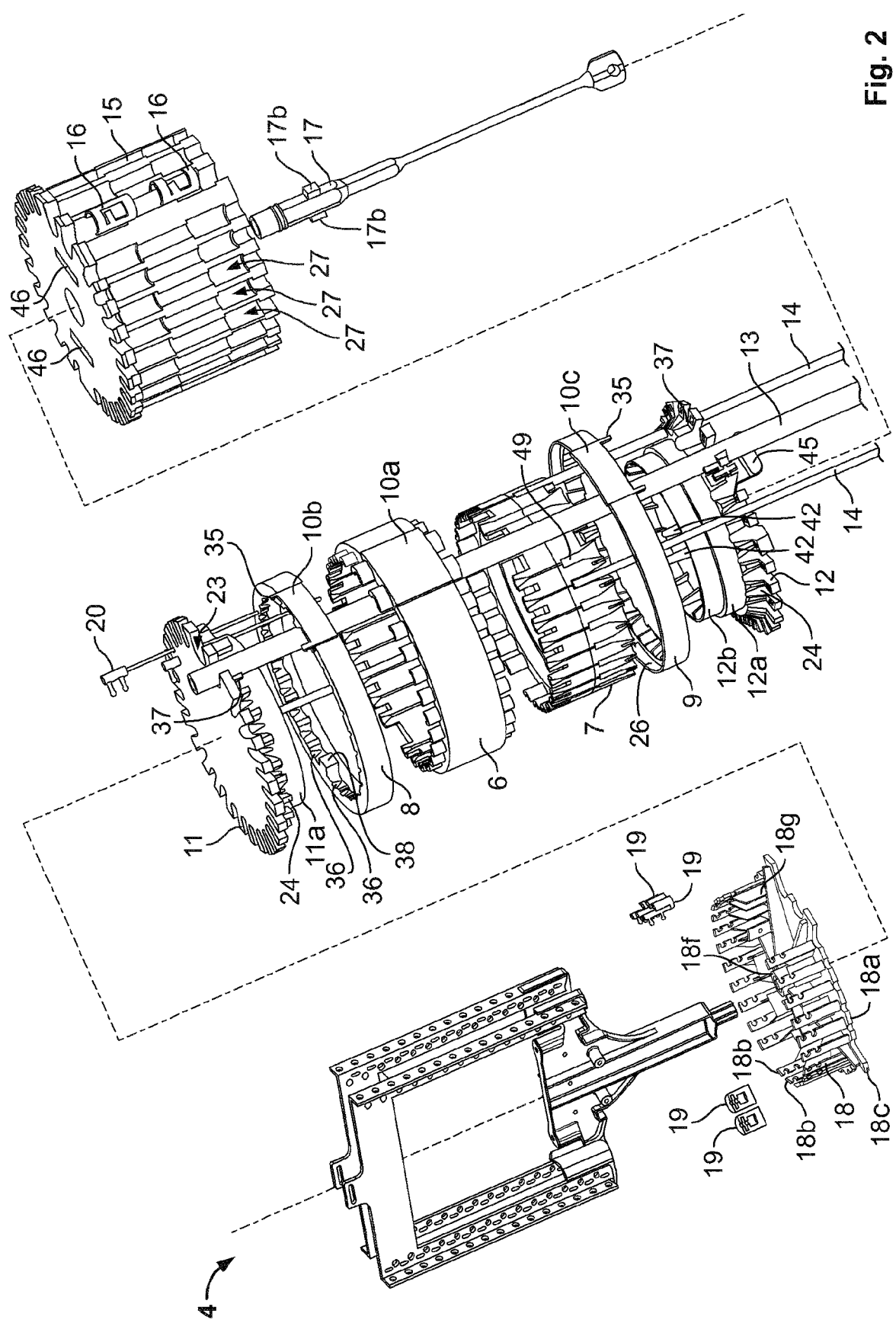
FIG. 2 shows an exploded perspective side view of the housing of FIGS. 1A to 1C without the upper and lower housing bodies.

As shown in FIG. 2, the fixation member holder 18 comprises a plurality of bar-shaped protrusions 18b extending in axial direction towards the upper side. Thereby, the fixation member holder 18 adopts a crown shape. Each bar-shaped protrusion 18b is adapted to hold a fixation member 19 which can be attached to an end side of a cable guided by the tube 14. In particular, said bar-shaped protrusion 18b comprises in axial direction two openings which communicate with an outside of the bar-shaped protrusion 18b by a recess extending from the opening to the circumferential edge of the bar-shaped protrusion 18b. The fixation members 19 have two pins adapted to be received by the openings of the bar-shaped protrusion 18b wherein said pins have at its free end side, a swelling part with an outer width larger than the middle section of the pin extending from the fixation member holder base 18a to the swelling part. The middle section of the fixation member 19 has an outer width being equal or smaller than the recess directing to the opening of the bar-shaped protrusion 18b. The fixation member 19 is inserted from the side of the bar-shaped protrusion 18b, i.e. the fixation member 19 is inserted into the openings of the bar-shaped protrusion 18b from the circumferential side. Thereby, the fixation member 19 is axially and radially fixed with respect to the fixation member holder 18.

On a radially inner side of the bar-shaped protrusion 18b, a reinforcing member 18g is provided which fixes the bar-shaped protrusion 18b to the upper surface side of the fixation member holder base 18a. Moreover, the fixation member holder 18 comprises a plurality elongations 18c extending between the bar-shaped protrusions 18b to the radial outer side, wherein the plurality of elongations 18c forms an outer circumference having a diameter larger than a diameter of the gel sealing device and smaller than an inner diameter of the lower housing body 3. The sections between the pluralities of elongations 18c form an inner circumference with a diameter smaller than the diameter of the gel sealing device. The plurality of elongations 18c is supported by an upper section of the lower housing body 3. In particular, the lower housing body 3 comprises in axial direction, a lower section and the upper section, wherein the upper section has an inner diameter larger than the lower section. Thereby, a step forming an abutment surface extending in radial direction of the lower housing body 3 is formed at the change-over between the upper section and the lower section of the lower housing body 3. The upper section of the lower housing body 3 comprises at its inner circumferential surface, a plurality of protrusions projecting radially from the inner circumferential surface by a length being equal to or smaller than a radial length of the abutment surface formed by the step. The plurality of protrusions projects further in axial direction at least until the upper edge of the upper section. The plurality of protrusions are arranged in such a manner that a plurality of recesses is formed therebetween which are adapted to axially receive the plurality of elongations 18c provided with the fixation member holder 18 from the upper side of the lower housing body 3. In an assembled state of the fixation member holder 18 within the lower housing body 3, a twist of the fixation member holder 18 with respect to the lower housing body 3 can be prevented thereby.

As it is evident from FIGS. 1A to 3B, the gel sealing device retained in the passage of the lower housing body 3 protrudes from the lower side of the lower housing body 3 by a predetermined length. As shown in FIG. 2, the gel sealing block 5 comprises an upper flange 11 and a lower flange 12 with a support section 11a, 12a disposed therebetween, wherein the upper and lower flanges 11, 12 sandwich in axial direction, a gel inner ring 7 and a gel outer ring 6, 10a covering the gel inner ring 7 in radial direction, wherein the gel inner ring 7 and the gel outer ring 6, 10a forms a sealing section therebetween. The gel sealing device further comprises at the lower side of the lower flange 12, a cable and tube alignment and supporting means 15 for guiding and holding the main cable 13 and the plurality of tubes 14 extending from the lower side of the lower housing body 3.

Figure 3A:
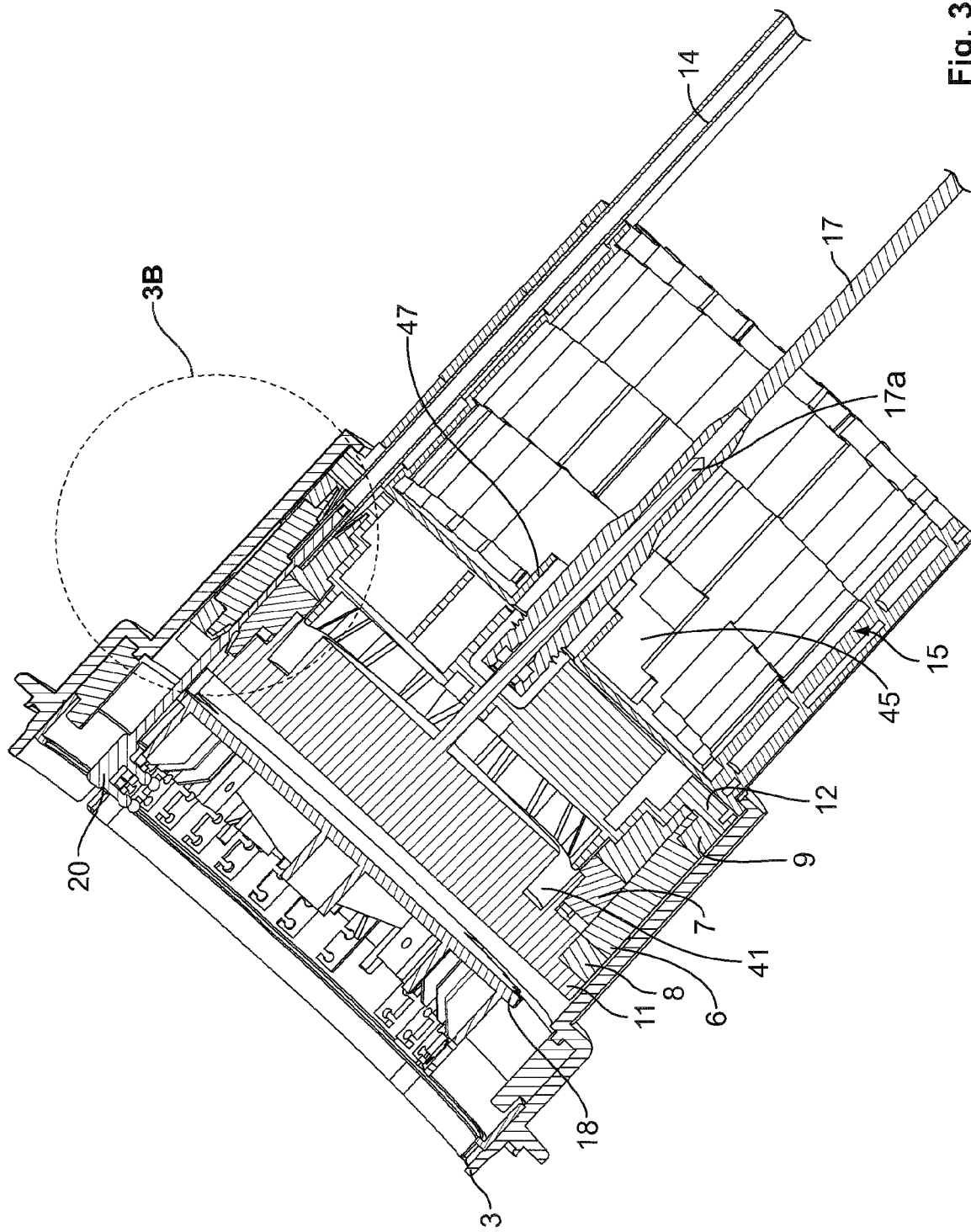
FIG. 3A shows a cross-sectional side view of the housing of FIG. 1B without the loop section holder.

As can be seen from FIGS. 2 to 3A, the upper flange 11 is disc-shaped and has at its outer circumference, a plurality of recesses providing a plurality of passageways 23 extending in axial direction. The upper flange 11 comprises at its lower side, a cylindrical round-shaped protrusion 11a having an outer diameter smaller than an inner diameter defined by the bottoms of the plurality of passageways 23. The round-shaped protrusion 11a projects from the lower side of the upper flange 11 toward the lower flange 12. The outer circumferential surface of the round-shaped protrusion 11a provides a first portion of the support section 11a, 12a, 12b formed between the upper and lower flanges 11, 12. The upper flange 11 comprises at its lower side, i.e. the side surrounded by the outer circumferential surface of the round-shaped protrusion 11a, a ring-shaped recess 41 and in the centre axis, a pin-like member 17a extending from the lower side of the upper flange 11 towards the lower flange 12 and towards the cable and tube alignment and supporting means 15. The ring-shaped recess 41 is adapted to receive a free-end side of a ring-shaped protrusion 12b provided with the lower flange 12. The recess 41 and the pin-like member 17a both extend in axial direction.

The lower flange 12 is disc-shaped and comprises a plurality of recesses at its outer circumference, forming a plurality of passageways 23 extending in axial direction. The lower flange 12 has at its upper side, a step formed round-shaped protrusion 12a, 12b projecting from the upper side of the lower flange 12 in axial direction. An outer diameter of the step formed round-shaped protrusion 12a, 12b is smaller than an inner diameter defined by the bottoms of the plurality of the passageways 23 formed in the outer circumference of the lower flange 12. The step formed round-shaped protrusions 12a, 12b has a first section 12a fixed to the upper side of the lower flange 12 and having an outer diameter larger than an outer diameter of the second section 12b projecting from an upper side of the first section 12a. The second section 12b is ring-shaped and is adapted to be received by the ring-shaped recess 41 provided with the upper flange 11. The outer circumferential surfaces of the step formed round shaped protrusions 12a, 12b form the remaining part of the support section 11a, 12a, 12b disposed between the upper flange 11 and the lower flange 12.

The lower flange 12 further comprises an opening at its central portion which guides therethrough the pin-like member 17a formed with the upper flange 11. The lower flange 12 comprises on its upper side in the area between the ring-shaped, second section 12b, several pin-like protrusions 42 projecting from the other side of the lower flange 12 in axial direction. Said pin-like protrusions 42 cooperate with thereto associated recesses formed in the lower side of the upper flange 11 in a radial inner area defined by the ring-shaped recess 41. In particular, the pin-like protrusions 42 are received by the corresponding recesses provided with the upper flange 11 in an assembled state of the gel sealing block 5, whereby said recesses and the pin-like protrusions 42 form a twist-preventing means preventing a twist of the upper flange 11 with respect to the lower flange 12 in said assembled state. Further, the lower flange 12 and the upper flange 11 are movable with respect to each other, wherein the ring-shaped second section 12b is fitted into the ring-shaped recess 41 of the upper flange 11.

The upper flange 11 and the lower flange 12 have each at their opposing sides, in axial elongation of the passageways 23, protruding lips 24, 28 for guiding and aligning the cable and tube into and out of the sealing section 22 formed between the gel inner ring 7 and the gel outer ring 6, 10a. As said lips 24, 28 are substantially identically shaped, the lips 24 provided with the lower flange 12 will be described in detail in the following, wherein the described configuration of said lips 24 also applies basically in a corresponding manner to the lips 28 formed with the upper flange 11.

Figure 3B:
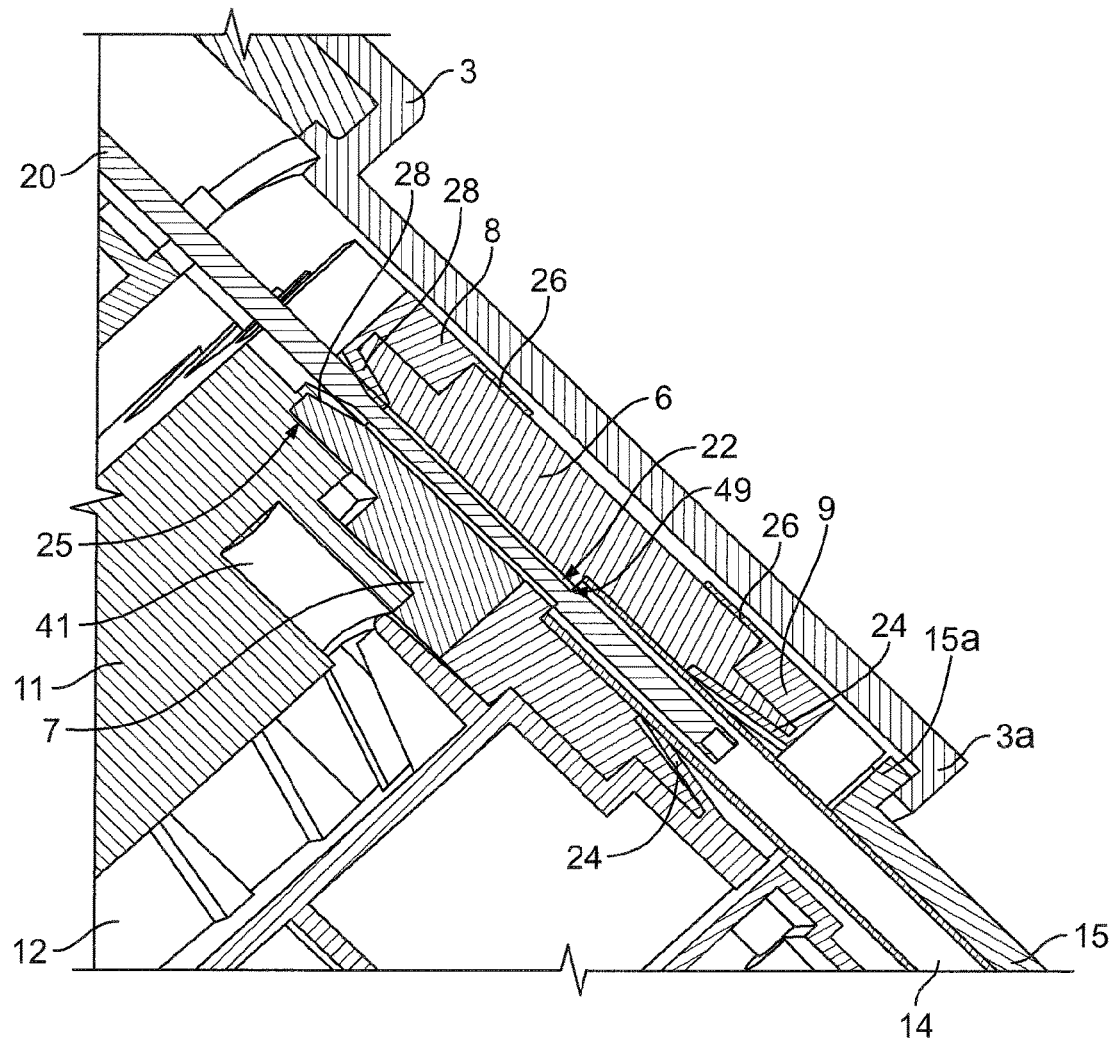
FIG. 3B shows an enlarged view of section IIIB of FIG. 3A.

As shown in FIGS. 2 to 3B, the lower flange 12 comprises directly adjacent to the passageway 23 in axial elongation thereof, at its upper side, the conical half-shell shaped lips 24 having a large diameter lower side fixed to the lower flange 12 and a small diameter upper side denoting a free-end side. The opening diameter of said small diameter upper side corresponds to an outer diameter of the tube 14 guided by said lip 24. The conical half-shell shaped lip 28 formed with the upper flange 11 has a small diameter lower side with an opening diameter corresponding to an outer diameter of the cable guided through the tube 14, which ends in the sealing section 22. Further, the lower flange 12 provides on a radial inner side of the conical half-shell shaped lip 24, a recess for receiving the gel sealing material of the gel inner ring 7 in an assembled state of the gel sealing block 5. Thereby, the conical half-shell shaped lip 24 is surrounded by the gel sealing material of the gel inner ring 7 at last in the assembled state of the gel sealing block 5, wherein the gel inner ring 7 forms at its axial end side sealing lips. The lower flange 12 further provides between adjacent conical half-shell shaped lips 24, a support surface for radially supporting a lower ring 9, 10c. In other words, the lower flange 12 comprises in axial elongation of the wall sections defining the passageway 23, an axial protrusion forming a radial support surface which extends from a radial surface of said wall sections to the upper side. The surface formed by the wall sections on the upper side of the lower flange 11 and extending to the radial outer side forms an axial support surface for the lower ring 9, 10c. Thus, the lower ring 9, 10c is supported by the lower flange 12 in axial and radial direction by the aforesaid support surfaces provided at the upper side of the wall sections defining the passageways 23. Furthermore, the lower flange 12 supports a lower axial end side of the gel inner ring 7 by the recesses formed in radial inner direction of the conical half-shell shaped lips 24, the large diameter side thereof are fixed to the wall sections defining the passageways 23. Whereas the axial lower end side of the gel outer ring 6, 10a, is supported by the lower ring 9, 10c.

Figure 4:
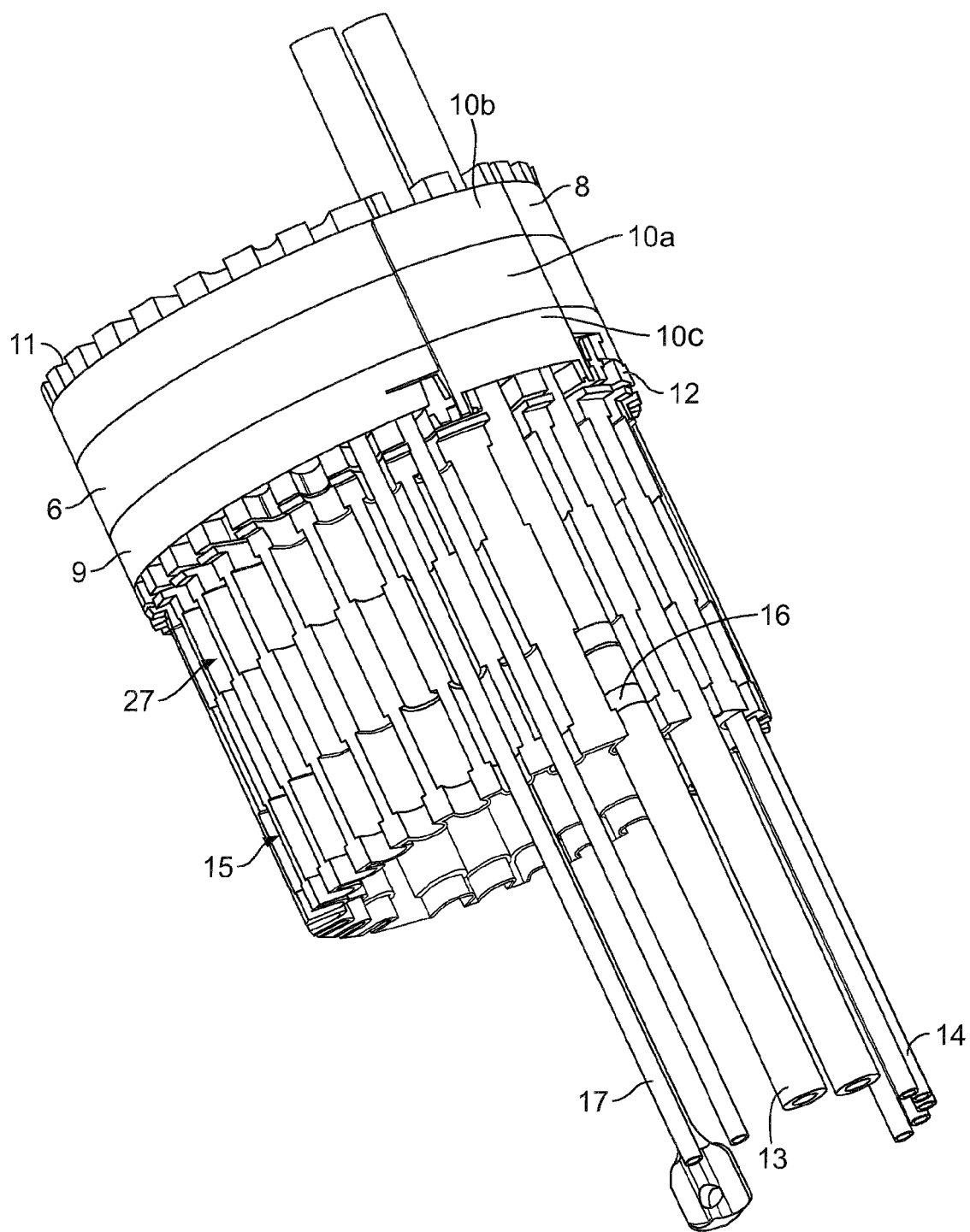
FIG. 4 shows a perspective side view of the gel sealing device of FIG. 2.
Figure 5:
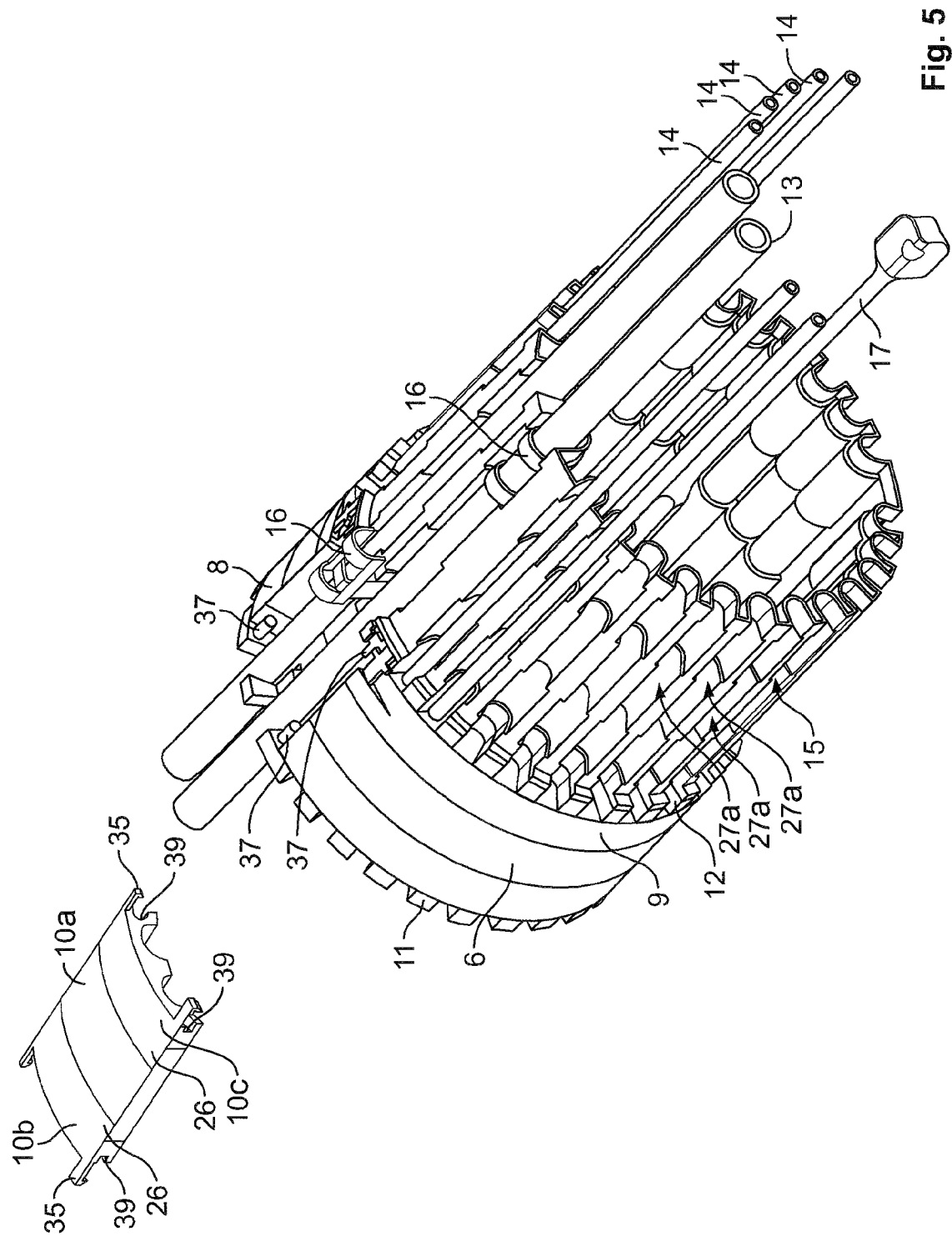
FIG. 5 shows a perspective side view of the gel sealing device of FIG. 4 with disassembled second circumferential segment.

As it is evident from FIGS. 2, 4 and 5, the gel inner ring 7 is formed of at least one ring extending continuously in circumferential direction and being supported by the support section 11a, 12a, 12b formed by the upper flange 11 and the lower flange 12, respectively. Whereas the gel outer ring 6, the lower ring 9, 10c and the upper ring 8, 10b are each comprised of two circumferential segments. In particular, the gel outer ring 6, 10a comprises a first circumferential segment 6 and a second circumferential segment 10a, which form in an assembled manner, the continuous gel outer ring 6, 10a. The first circumferential segment 6 is adapted to form with the gel inner ring 7, a sealing section 22 for the tube end of the plurality of tubes 14 guided by the passageway 23 and protruding lips 24 into the sealing section 22. The gel inner ring 7 and the first circumferential segment 6 of the gel outer ring 6, 10a form for each tube end in the sealing section 22 a termination 49 against which the axial end side of tube 14 abuts in its assembled state (FIGS. 2 and 3B). Particularly, each of the gel inner ring 7 and the first circumferential segment 6 provides a groove ranging from the lower flange 12 side into the sealing section 22, wherein the grooves of the gel inner ring 7 are aligned with thereto assigned grooves provided with the first circumferential segment 6. Respective assigned grooves form in an assembled state of the gel sealing device the termination 49 at their end side in the sealing section 22, wherein each groove is adapted to partially surround the received tube end, and wherein the termination 49 provides a central opening to guide there through the signal transmitting element protruding from the tube end at the termination 49 towards the upper flange 11.

The second circumferential segment 10a is adapted to form with the gel inner ring 7, a sealing section 22 at a position where the main cable 13 extends there through from the lower side to the upper side of the lower housing body 3. In compliance with the segmental configuration of the gel outer ring 6, 10a, the lower ring 9, 10c and the upper ring 8, 10b comprises each a first ring segment 10b, 10c and a second ring segment 8, 9, respectively. The first ring segment 10b, 10c and the second ring segment 8, 9 form in an assembled manner, the continuous upper ring 8, 10b and the continuous lower ring 9, 10c, respectively. Each of the upper ring 8, 10b and the lower ring 9, 10c, has on its inner circumferential side, a protruding lip pattern which corresponds in shape and configuration to the protruding lips 24, 28 provided with the upper flange 11 and the lower flange 12, respectively. Accordingly, the conical half-shell shaped lips 28 of the upper flange 11 and the upper ring 8, 10b and the lower flange 12 and the lower ring 9, 10c, respectively, form a conical channel with a free end side having an opening diameter adapted to guide therethrough, the main cable 13, the tube 14 and the cable guided through the tube 14, respectively (FIG. 3B).

The lower ring 9, 10c and the upper ring 8, 10b, further comprises a rim 26 extending at its outer circumference in axial direction towards the gel outer ring 6, 10a for covering and thereby radially supporting an outer circumferential surface of the axial upper and lower ends of the gel outer ring 6, 10a. Each of the upper and lower ring segments 8, 10b; 9, 10c is secured to the upper flange 11 and the lower flange 12, respectively. In particular, the upper and lower second ring segments 8, 9 comprises fixation and alignment means 37, 38, which are provided at circumferential end sections and at the circumferential middle section of the upper and lower second ring segment 8, 9, respectively. The fixation and alignment means 38 in the middle circumferential section constitutes a latching means comprised of a detent and latch, wherein the latch is formed with the upper and lower flange 11, 12, respectively and wherein the detent is formed with the upper and lower second ring segment 8, 9, respectively. Adjacent to the detent at both circumferential sides thereof, a hinge portion 36 made of a bend extending axially is provided for allowing a releasing of the part of the second ring segment 8, 9 extending from the hinge portion 36 to the circumferential end side from the gel sealing device in a secured state of the detent, i.e. of the second ring segment 8, 9.

The fixation and alignment means provided at each circumferential end side of the upper and lower second ring segments 8, 9, respectively, is comprised of a pin receiving hole which receives a pin 37 formed at the sides of the upper and lower flanges 11, 12 which opposes the upper and lower second ring segment 8, 9, respectively, and which is formed in axial elongation of the abutment surface of the wall sections defining the passageways 23. Thereby, the upper and lower second ring segments 8, 9 are securable to the upper and lower flanges 11, 12, respectively, by assembling the fixation and alignment means in axial direction.

Figure 6:
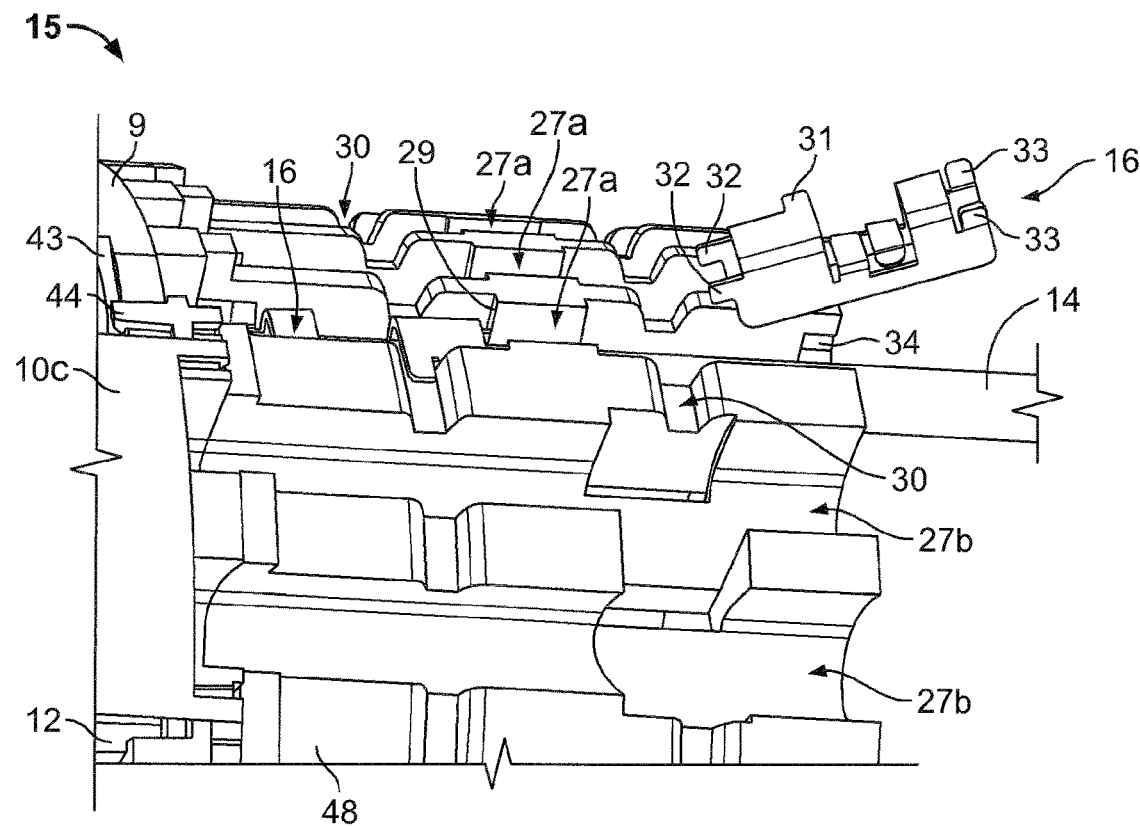
FIG. 6 shows a side view of the cable end tube alignment means.

Furthermore, the upper first ring segment 10b and the lower first ring segment 10c have an identical shape. Accordingly, in the following, the upper first ring segment 10b will be described in detail, wherein the described configuration of said upper first ring segment 10b, also applies to the lower first ring segment 10c. As shown in FIG. 5, the upper first ring segment 10b has a circumferential length corresponding to a circumferential length of the second circumferential segment 10a of the gel outer ring 6, 10a. Thus, the upper first ring segment 10b, the second circumferential segment 10a and the lower first ring segment 10c form in an assembled manner one part with common circumferential end sides extending in axial direction. The upper first ring segment 10b comprises at its radial inner side, two conical half-shell shaped lips which cooperate with the conical half-shell shaped lips 24 formed with the upper flange 11 to form a conical shaped cable channel for the main cable 13. The upper first ring segment 10b comprises further a rim section 26 covering radially, the upper axial end side of the second circumferential segment 10a. Moreover, the first ring segment 10b has two axial protrusions 35 at its upper side opposing the rim section 26, wherein said two axial protrusions 35 are disposed at the circumferential end sides of the upper first ring segment 10b, respectively, as an axial elongation of said circumferential end sides. Said two axial protrusions 35 form a detent with a hook portion at its free end side which grabs the upper flange 11 from its circumferential side. The upper flange 11 provides at its outer circumference a groove extending in axial direction of the gel sealing device for receiving the detent in an embedded state (FIG. 6). The groove ends at the upper side of the upper flange 11 in a recess portion receiving the hook portion of the detent, wherein the detent ends at latest in a surface plane formed by the upper surface of the upper flange 11. Accordingly, said two axial protrusions 35 have an axial length equal to or smaller than a thickness of the wall section defining the passageway 23 in axial direction. The lower first ring segment 10b, further comprises radially inside with respect to said two axial protrusions 35 at or near the edges of circumferential end sides, a receiving hole 39 adapted to receive a pin 37 formed with the upper flange 11 in a manner corresponding to the pin 37 of the fixation and alignment means described with respect to the upper second ring segment 8. In particular, the pin 37 for securing the upper second ring segment 8 and the upper first ring segment 10b are formed adjacently and protruding from an identical wall section in axial direction (FIG. 5).

As shown in FIG. 6, the lower ring segment 9 comprises on its outer circumferential surface, in the region at the circumferential end sides, a groove 43 which cooperates with a detent 44, extending at a corresponding position from the lower flange 12 in axial direction. Said detent 44 is formed on the circumferential outer surface of the wall section defining the passageway 23 for the main cable 13, wherein said detent 44 is cross-shaped with a first part extending in axial direction forming the detent engaging the groove 43 and with a second part extending perpendicular to the aforesaid first part in axial direction and being fixed to the upper circumferential surface of the lower flange 12 for forming a pivot axis about which the detent 44 can be tilted to loosen the fixation of the lower second ring segment 9 to said detent 44.

As further shown in FIG. 2, the gel sealing device comprises a cable and tube alignment and supporting means 15 attached to the lower side of the lower flange 12. The lower flange 12 comprises latching means 45 axial protruding from the lower side of the lower flange 12 and being received by a recess 46 provided on the upper side of the cable and tube alignment and supporting means 15. The cable and tube alignment and supporting means 15 has a flat upper surface extending in radial direction and provided to abut against the lower surface of the lower flange 12. As can be seen from FIG. 3A, the cable and tube alignment and supporting means 15 has a central opening through which the pin-like member 17a of the upper flange 11 extends towards the lower side. Said pin-like member 17a is received by a rod 17 extending with one end, in axial direction through said central opening of the cable and tube alignment and supporting means 15 and hence, in the opening provided at the lower side of the lower flange 12. The rod 17 is adapted to retain the pin-like member 17a in order to move the upper flange 11 in axial direction. Particularly, the pin-like member 17a has a male screw thread at the free end side received by the rod 17, which has a female screw thread engaging said male screw thread. Thus, by rotational movement of the rod 17 in one circumferential direction, the upper flange 11 is moved towards the lower flange 12. By rotating the rod 17 in the opposite direction, the upper flange 11 is moved towards the upper side, i.e. in a direction opposing the lower flange 12. The rod 17 comprises at its free end side a hand-hold formed by two opposing wings and an opening extending in a direction transverse to the axial direction. Through said transverse opening, a further rod can be inserted to form a level by which an increased rotational force can be applied to reliable compress the gel inner ring 7 and the gel outer ring 6, 10a. Moreover, the rod 17 has in a region near the end which receives the pin-like member 17a, counter-pressure parts 17b abutting against a lower circumferential surface side of a protrusion extending from the lower side of the cable and tube alignment and supporting means 15 and surrounding the opening through which the pin-like member 17a received by the rod 17 extends. Said counter-pressure parts 17b are formed of short bar-shaped protrusions extending in radial direction from the rod 17 in opposing directions. Said bar-shaped protrusions 17b have a radial length larger than an inner diameter of the protrusion 46 extending from the lower side of the cable and tube alignment and supporting means 15. Said bar-shaped protrusions 17b abutting against said ring-shaped protrusion 47 in an assembled state of the gel sealing block 5 provides a counterpart to the axial pressured applied by the gel inner ring 7 and the gel outer ring 6, 10a in the compressed state to prevent a loosening of said compressed state.

The cable and tube alignment and supporting means 15 comprises at its outer circumferential surface, a plurality of cable and tube retaining channels 27a, 27b, each extending in axial direction in elongation of the passageway 23 formed with the lower flange 12. The configuration of the cable and tube retaining channels 27a, 27b will be described below with respect to FIGS. 6 and 7.

As is further evident from FIG. 3A, the cable and tube alignment and supporting means 15 comprises a flange portion 15a at its upper side for abutting against a flange 3a formed with the lower housing body 3 at its lower side. In particular, the upper side of the cable and tube alignment and supporting means 15 has an outer diameter corresponding substantially to the inner diameter of the lower section of the lower housing body 3, whereas the circumferential surface of the cable and tube alignment and supporting means 15 extending from said flange 15a to the lower side has an outer diameter being equal or smaller than an inner diameter formed by the lower flange 3a of the lower housing body 3. Accordingly, the gel sealing block 5 is supported by the lower housing body 3 in axial direction by the flange 3a formed at the lower side of the lower housing body 3. The outer diameter of the gel sealing device is equal or smaller than the inner diameter of the lower section of the lower housing body 3 without the flange 3a. Thus, the gel sealing block 5 is axially inserted into said lower housing body 3 from its upper side.

Figure 7:
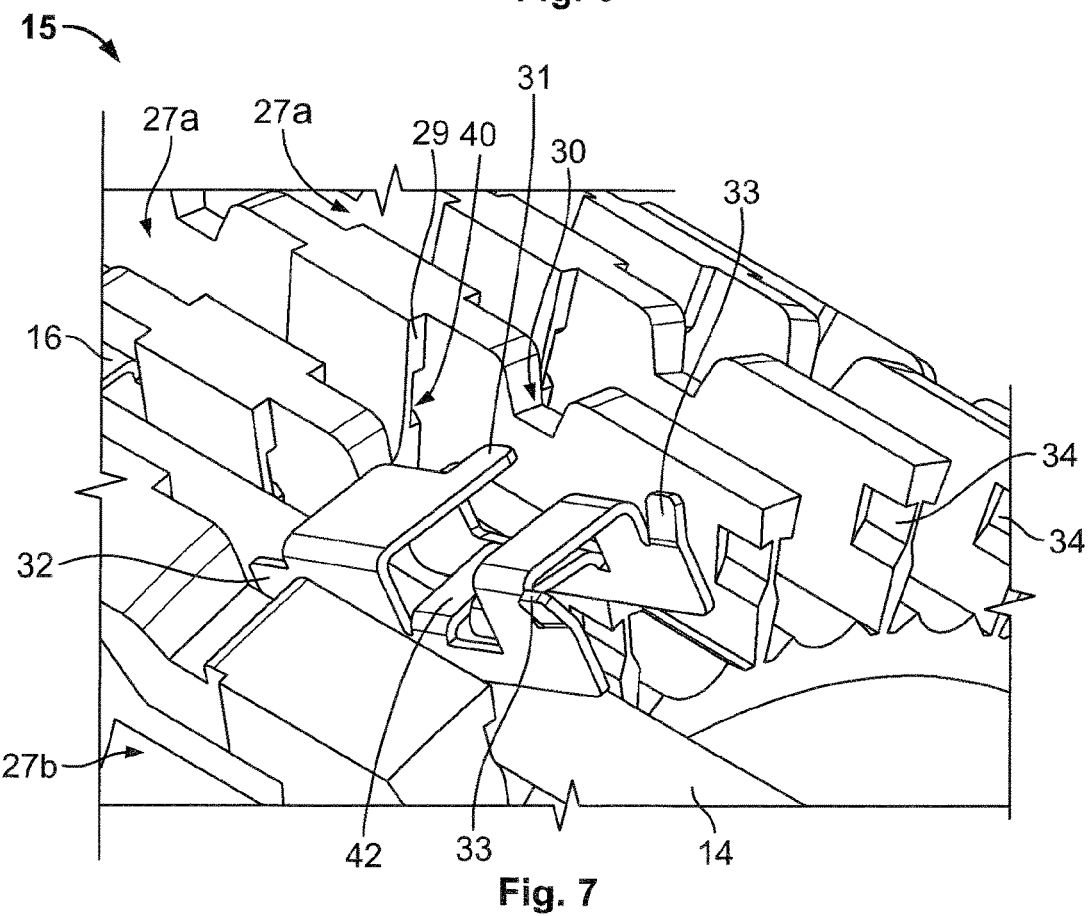
FIG. 7 shows a perspective rear-side view of the cable and tube alignment means of FIG. 6.

FIGS. 6 and 7 show a side view and a perspective rear side view of the cable and tube alignment and supporting means 15 attached to the lower housing body 3 by means of the flange 15a formed on the upper end of the cable and tube alignment and supporting means 15 and supporting the lower side of the lower flange 12. The cable and tube channels 27a, 27b extending in axial direction in elongation of the passageways 23 comprises a cable guiding channel 27b for guiding the main cable 13 in axial direction and a tube guiding channel 27a for guiding the tubes 14 in axial direction. The cable guiding channel 27b has recesses for fixing the main cable 13 to the cable and tube alignment and supporting means 15 by means of cable strap. The tube guiding channel 27a has in axial direction an upper section, a middle section and a lower section wherein the upper section is arranged adjacent to the lower flange 12 and wherein the lower section is provided at the lower side of the cable and tube alignment and supporting means 15. The middle section has in circumferential direction, a width smaller than the upper and lower sections. Thereby, a change-over formed between the middle section and the upper and lower sections, respectively, provides an abutment surface 29 extending in circumferential direction. Said abutment surface 29 comprises a recess portion 40 extending in axial direction (FIG. 7). The tube guiding channels 27a and the cable guiding channels 27b are each separated by wall sections 48 extending in axial direction. An outer circumferential surface of said wall sections 48 forms the outer circumferential surface of the cable and tube alignment and supporting means 15. The wall sections 48 comprise in an area of the upper and lower sections of the tube guiding channel 27a a recess 30 formed in circumferential direction over the circumferential width of said wall sections 48, respectively. The surface sides of the wall sections 48 defining the tube guiding channel 27a have in the region of the upper and lower sections of the tube guiding channel 27a in an area of the axial end sides, a vertical recess portion 34. Said vertical recess portion 34 provides at its outer side and at its axial end side, which is near the middle section of the tube guiding channel 27a, counter-surfaces adapted to prevent an axial and radial displacement of an element abutting against said counter-surfaces, respectively. As particularly shown in FIG. 7, the tube guiding channel 27a has an undulated bottom surface formed of two wave crests extending in axial direction in compliance with the direction of extension of the tube guiding channel 27a. The middle wave trough formed between the two wave crests is adapted to guide the tube 14 in axial direction and has a shape corresponding to the shape of the part of the tube 14 placed therein and guided thereby.

FIGS. 6 and 7 further show a tube clamp 16 of a sliding carriage shape. In particular, the tube clamp 16 has two cross-sectional U-shaped tube receiving sections with a middle recess section disposed there between. The middle recess section is formed by elongated journals of the U-shaped tube receiving sections, wherein the U-shaped tube receiving sections and the middle recess section provide at both circumferential sides of the tube clamp 16, a common surface side. The middle recess section constituting a bridge section has two circumferential extending elastically lips each protruding from one circumferential side to the opposed circumferential side of the tube clamp 16. One circumferential extending elastically lip is fixed to one circumferential side of the tube clamp 16, wherein the other is fixed to the opposed side. The lips are adapted to expand to a radial outer side by mounting the tube clamp 16 onto the tube 14. Thus, the tube 14 inserted into the tube guiding channel 27a is pressed by said circumferential extending lips onto the bottom surface of the tube guiding channel 27a.

The tube clamp 16 has at one axial end side, two axial protrusions 32 protruding from the U-shaped receiving section in axial direction. Said axial protrusions 32 are adapted to be received by the recess 40 formed in the abutment surface 29 at the change-over between the middle section and the lower and upper sections of the tube guiding channel 27a. At the opposed axial end side of the tube clamp 16, a second recess portion is formed, which has two engaging pawls 33 extending from said recess portion in circumferential direction. Hence, said engaging pawls 33, if viewed from a rear side of the tube clamp 16 (see FIG. 7) extend from the elongated journals of the U-shaped tube receiving section. Said engaging pawls 33 are adapted to be received by the vertical recess portions 34 formed in the upper and lower sections of the tube guiding channel 27a. The tube clamp 16 further comprises a circumferential side protrusion 31 which extends from the U-shaped tube receiving section to the circumferential outer side of the tube clamp 16. Said circumferential side protrusion 31 is adapted to be received by the circumferential recess 30 formed on the outer circumferential surface side of the wall sections defining the tube guiding channels 27a. In addition, the tube clamp 16 has in radial inner direction with respect to the axial protrusion 32, a round-shaped edge between the front edge facing the abutment surface 29 and the radial inner edge on the bottom surface of the tube guiding channel 27a. The round shaped edge allows a tiltable insertion of the tube clamp 16 into the tube guiding channel 27a, wherein the axial protrusions 32 are first inserted into the assigned recesses 40 and then the engaging pawls 33 are clamped into the assigned vertical recesses 34.

By inserting at least one tube clamp 16 into the tube guiding channel 27a, the tube 14 is axially fixed at least in one axial direction by the abutment surface 29 cooperating with the front edge of the tube clamp 16 from which the axial protrusion 32 projects in combination with a cooperation of the vertical recess 34 receiving the engaging pawls 33. By inserting two identical tube clamps 16 in said tube guiding channel 27a in an opposed manner as shown in FIG. 6, the tube 14 is axially fixed along opposing axial directions.

Furthermore, an axial fixation of the tube 14 in said tube guiding channel 27a, is further obtained by the cooperation of the circumferential side protrusion 31 received by the circumferential recess 30. The radial fixation of said tube 14 is achieved by the axial protrusion 32 inserted into the recess 40 and by the engaging pawls 33 received by the vertical recess portions 34.

Based on such fixation, the tube 14 can be reliably aligned and held with its tube end in the sealing section 22 provided between the gel inner ring 7 and the gel outer ring 6, 10a as shown in FIGS. 3A and 3B.

Figure 8:
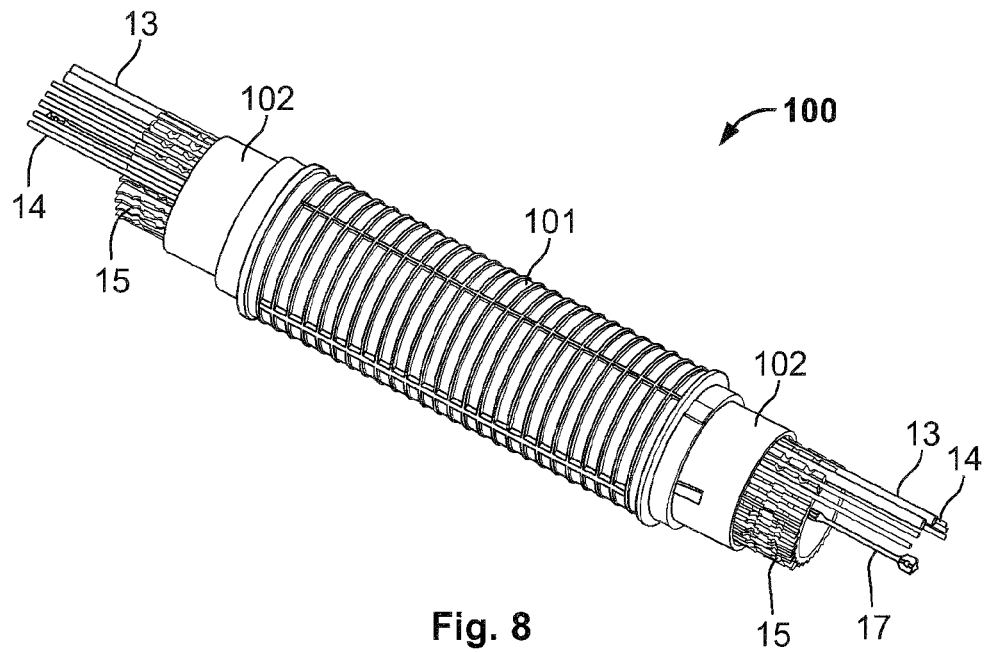
FIG. 8 shows a perspective side view of a further housing comprising the gel sealing device according to the embodiment in an assembled.
Figure 9:
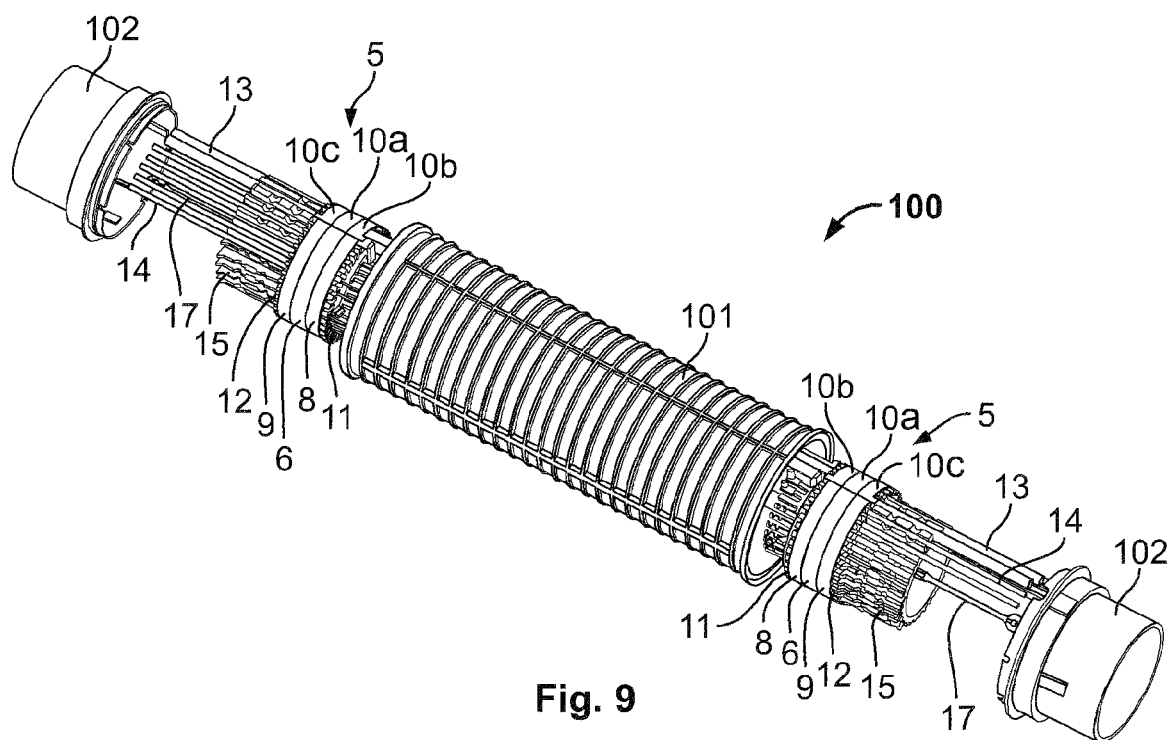
FIG. 9 shows an exploded perspective side view of the housing of FIG. 8.

FIGS. 8 and 9 show a further housing 100 receiving two gel sealing devices according to the preferred embodiment as described above. As a matter of course, the further housing 100 can be adapted to receive different gel sealing devices. Said further housing 100 comprises a tubular upper housing body 101 providing a common cable organizing area for the cables guided and sealed by the gel sealing devices, wherein said cable organizing area is provided between openings formed at the axial end sides of the upper housing body 101. Each axial end side of the upper housing body 101 is connectable to a lower housing body 102 in a similar manner as described with respect to the upper housing body 2 and the lower housing body 3 of the above-described housing 1. Particularly, the lower housing body 102 which receives the gel sealing device and the assigned end side of the upper housing body 101 are basically configured in a corresponding manner as the lower and upper housing bodies 3, 2 of the above housing 1, wherein the gel sealing device is retained in each lower housing body 102 in axial direction thereof.

A method of inserting the main cable 13 and the tubes 14 in the housing 1 according to the above preferred embodiment of the present invention will now be described. In case the housing 1 is pre-assembled as shown in FIG. 1A, the upper housing body 2 is removed from the lower housing body 3 which is then moved to the lower side to expose the gel sealing block 5. The main cable 13 and the tubes 14 to be installed in the gel sealing block 5 are inserted through the passage of the lower housing body 3. To facilitate the installation, the sealing section 22 provided between the gel inner ring 7 and the gel outer ring 6, 10a is accessibly exposed by a rotational movement of the rod 17 in one circumferential direction corresponding to the releasing direction, wherein the upper flange 11 moves to the upper side, i.e. away from the lower flange 12, thereby decompressing the gel inner ring 7 with respect to the gel outer ring 6, 10a. By said axial movement of the upper flange 11 away from the lower flange 12, the fixation of the upper and lower first ring segments 10b, 10c with the second circumferential segment 10a sandwiched therebetween is released. Particularly, the pin receiving hole 39 and the pin 37 are separated from each other. Thus, the upper and lower first ring segments 10b, 10c with the second circumferential segment 10a can be removed from the gel sealing block 5. Said release can be performed with or without releasing the upper and lower second ring segments 8, 9 sandwiching the first circumferential segment 6. Then, the main cable 13 is inserted from the radial outer side of the gel sealing block 5 into the passageway 23 and the cable guiding channel 27b provided with the upper flange 11, the lower flange 12 and the cable and tube alignment and supporting means 15. If necessary, the main cable 13 can be looped in the organizing area and guided back through the gel sealing block 5 to an outside of the housing 1. After insertion of the main cable 13 in the gel sealing block 5, the upper and lower first ring segments 10b, 10c with the second circumferential segment 10a are mounted onto the gel sealing block 5 by inserting the pin 37 into the pin receiving hole 39 and by moving the upper and lower flanges 11, 12 towards each other.

The insertion of the tube 14 can be performed in parallel with the insertion of the main cable 13 or separately thereto. Alternatively, or in addition to the release of the second circumferential segment 10a for exposing the sealing section 22, the upper and lower second ring segments 8, 9 with the first circumferential segment 6 sandwiched therebetween are hinged away from the gel sealing block 5 in a secured state of the upper and lower second ring segments 8, 9. The tube 14 is inserted from the radial outer side onto the gel sealing block 5 in such a manner that the tube end is placed in the groove onto the gel inner ring 7 in the sealing section 22. The tube end is aligned with respect to an inner end side of the groove forming with the assigned groove of the gel outer ring 6, 10a the termination 49. Further, the tube 14 is inserted in the tube guiding channel 27a and fixed thereto by tube clamps 16. In case the cable is not guided through the tube 14 toward the upper side of the gel sealing block 5, a cable dummy 20 can be introduced into said tube end from the axial upper side, wherein an upper part of the cable dummy 20 is held by the fixation member holder 18. Alternatively, the tube end can be closed by a tube end cap. In the event that a cable is guided through the tube 14 to the upper side of the gel sealing block 5, the cable is spliced with an assigned cable guided by the main cable 13, wherein the splicing is stored in the cable organizing area. If a splicing of the cable guided by the tube 14 should not be performed at this time of cable installation, the cable guided by the tube 14 can be fixed to a fixation member 19 which can be mounted on the fixation member holder 18. Thereby, if a splicing of said cable with the main cable 13 shall be performed at a later date, the upper housing body 2 merely needs to be removed from the housing 1 to provide an access to the free end of the cable held by the fixation member holder 18.

After performing the insertion of the cable 13 and/or the tube 14, the sealing sections comprising the cable 13 and the tube 14 are sealed by assembling the respective circumferential segments 6, 10a to the gel sealing block 5. The rod 17 is turned in circumferential direction corresponding to a mounting direction, wherein the upper flange 11 moves towards the lower flange 12, for fixing the gel outer ring 6, 10a with the upper and lower rings 8, 10b; 9, 10c. Prior or subsequent thereto, the gel sealing device is inserted into the passage of the lower housing body 3. In case, the gel sealing device is inserted after rotating the rod 17, the rod 17 is further rotated in the mounting direction for further compressing the gel inner ring 7 and gel outer ring 6, 10a, such that the outer circumference of the gel outer ring 6, 10a is pressed against the inner circumference of the lower housing body 3 to obtain the sealing. Then, the fixation member holder 18 with the loop section holder 4 is installed on the upper section of the lower housing body 3 by rotationally aligning the fixation member holder 18 due to the elongated protrusions 18c formed with the fixation member holder 18 and the recesses provided at the inner circumferential side of the upper section of the lower housing body 3. Then, the rod 17 can be further rotated in the mounting direction in case of need for further compressing the gel inner ring 7 and the gel outer ring 6, 10a, thereby further pressing the gel sealing material in the radial outer direction towards the inner circumferential surface of the lower section of the lower housing body 3 for obtaining a reliable sealing. The upper housing body 2 is fixed to the lower housing body 3 at least after installing the loop section holder 4.

The invention claimed is:

1. A sealing device comprising:
a housing body defining an interior, the housing body including an inner surface bounding the interior;
a sealing block sized to fit within the interior of the housing body, the sealing block including a sealing arrangement having an exterior surface that contacts the inner surface of the housing body, wherein the sealing arrangement includes gel, the sealing block including a support body that carries the sealing arrangement, the sealing arrangement having an interior surface that contacts the support body as the sealing arrangement extends around the support body, the sealing arrangement having a thickness extending along a reference axis between the exterior surface and the interior surface, the support body having a cross-dimension extending coaxial with the reference axis that is greater than the thickness of the sealing arrangement.

2. The sealing device of claim 1, wherein the cross-dimension of the support body is at least twice the thickness of the sealing arrangement.

3. The sealing device of claim 1, further comprising an actuator coupled to the support body, the actuator pressurizing the sealing arrangement when activated.

4. The sealing device of claim 3, wherein the support body extends between the sealing arrangement and the actuator.

5. The sealing device of claim 3, wherein the support body radially offsets the sealing arrangement from the actuator by more than a thickness of the sealing arrangement.

6. The sealing device of claim 3, wherein the support body includes first and second flanges at opposite ends of the support body, wherein activating the actuator moves the first and second flanges closer together to compress the sealing arrangement therebetween.

7. The sealing device of claim 1, wherein the sealing arrangement includes an inner gel seal and an outer gel seal that cooperate to define the thickness of the sealing arrangement, the inner and outer gel seals defining a sealing section therebetween.

8. The sealing device of claim 7, wherein the inner gel seal and the outer gel seal are ring-shaped.

9. The sealing device of claim 7, wherein the inner gel seal defines a plurality of first grooves; and wherein the outer gel seal defines a plurality of second grooves, each second groove aligning with one of the first grooves.

10. The sealing device of claim 7, wherein the outer gel seal is retained between first and second support rings.

11. The sealing device of claim 7, wherein the outer gel seal includes a first segment and a second segment, the second segment being removable from the inner gel seal separate from the first segment.

12. The sealing device of claim 11, wherein the first segment of the outer gel seal defines more grooves than the second segment of the outer gel seal.

13. The sealing device of claim 11, wherein the first segment of the outer gel seal is retained between respective first and second ring segments and wherein the second segment of the outer gel seal is retained between respective first and second ring segments.

14. The sealing device of claim 13, wherein the second segment of the outer gel seal defines two grooves extending between the respective first and second ring segments.

15. The sealing device of claim 13, wherein the first and second ring segments retaining the first segment have identical shapes.

16. The sealing device of claim 7, wherein the inner gel seal extends continuously in a circumferential direction.

17. The sealing device of claim 1, further comprising an alignment and support arrangement coupled to the support body, the alignment and support arrangement defining a plurality of cable retaining channels each aligned with the sealing arrangement of the sealing block.

18. The sealing device of claim 1, wherein the sealing arrangement includes a plurality of pieces.

19. The sealing device of claim 18, wherein the plurality of pieces includes an inner piece and an outer piece that cooperate to define the thickness of the sealing arrangement.

20. A sealing device comprising:
a housing body defining an interior, the housing body including an inner surface bounding the interior;
a sealing block sized to fit within the interior of the housing body, the sealing block including a sealing arrangement having an exterior surface that contacts the inner surface of the housing body, the sealing block including a support body that carries the sealing arrangement, the sealing arrangement having an interior surface that contacts the support body as the sealing arrangement extends around the support body, the sealing arrangement having a thickness extending along a reference axis between the exterior surface and the interior surface, the support body having a cross-dimension extending coaxial with the reference axis that is greater than the thickness of the sealing arrangement, wherein the sealing arrangement includes an inner gel seal and an outer gel seal that cooperate to define the thickness of the sealing arrangement, the inner and outer gel seals defining a sealing section therebetween.

* * * * *